(12) United States Patent
Donegan et al.

(10) Patent No.: US 10,609,908 B2
(45) Date of Patent: Apr. 7, 2020

(54) SMALL SEED CONVERTER FOR BIRD FEEDER

(71) Applicant: Classic Brands, LLC, Denver, CO (US)

(72) Inventors: Robert W. Donegan, Denver, CO (US); Bryan Krueger, Denver, CO (US); John W. Bruno, Parker, CO (US)

(73) Assignee: Classic Brands, LLC, Denver ( * ) Notice: Subject to any disclaimer, the term of this patent is extended or adjusted under 35 U.S.C. 154(b) by 247 days.

(21) Appl. No.: 14/531,755

(22) Filed: Nov. 3, 2014

(65) Prior Publication Data

US 2015/0122184 A1 May 7, 2015

Related U.S. Application Data

(60) Provisional application No. 61/899,044, filed on Nov. 1, 2013.

(51) Int. Cl.
| | | |
|---|---|---|
| *A01K 39/012* | (2006.01) | |
| *A01K 39/01* | (2006.01) | |
| *A01K 39/02* | (2006.01) | |
| *A01K 39/04* | (2006.01) | |
| *F16M 13/02* | (2006.01) | |

(52) U.S. Cl.
CPC ........ *A01K 39/012* (2013.01); *A01K 39/0113* (2013.01); *A01K 39/0206* (2013.01); *A01K 39/04* (2013.01); *F16M 13/02* (2013.01)

(58) Field of Classification Search
CPC .. A01K 39/012; A01K 31/12; A01K 39/0113; A01K 39/04

USPC ........ 119/51.01, 51.5, 52.2, 52.3, 52.1, 52.4, 119/53, 57.8, 57.9
See application file for complete search history.

(56) References Cited

U.S. PATENT DOCUMENTS

| | | |
|---|---|---|
| 15,982 A | 10/1856 | Moulton |
| D3,585 S | 7/1869 | Brown |
| D4,451 S | 11/1870 | Pitts |
| 117,807 A | 8/1871 | Orndoff |
| D7,964 S | 12/1874 | Morse |
| D17,296 S | 5/1887 | Putnam et al. |

(Continued)

FOREIGN PATENT DOCUMENTS

GB 2269305 A 4/1992

OTHER PUBLICATIONS

U.S. Appl. No. 29/557,613, filed Mar. 10, 2016, Donegan et al.
(Continued)

*Primary Examiner* — Trinh T Nguyen
(74) *Attorney, Agent, or Firm* — Polsinelli P.C.

(57) ABSTRACT

Implementations described and claimed herein provide apparatuses and methods for facilitating filling and cleaning of bird feeders that are aesthetically pleasing and adaptable for attracting different types of birds. In one implementation, a bird feeder includes a port having a surface extending from a proximal end to a distal end. The proximal end has a connecting portion configured to connect to a reservoir. The surface has one or more openings defined therein. A small seed converter is insertable into the port, and the small seed converter includes a plurality of teeth extending from an edge. The plurality of teeth are configured to narrow the one or more openings for dispensing small sized seed.

20 Claims, 14 Drawing Sheets

(56) References Cited

U.S. PATENT DOCUMENTS

| | | |
|---|---|---|
| D22,607 S | 7/1893 | Johnes |
| 502,559 A | 8/1893 | Gilman |
| D24,947 S | 12/1895 | Feeny et al. |
| D28,734 S | 5/1898 | Muller |
| 632,167 A | 8/1899 | Biesmeyer |
| D36,459 S | 7/1903 | Brosi |
| 813,954 A | 2/1906 | Davis |
| D39,701 S | 12/1908 | Watkins |
| 954,968 A | 4/1910 | Jacoy |
| 1,010,543 A | 12/1911 | Walter et al. |
| 1,023,240 A | 4/1912 | Bowier |
| D43,781 S | 4/1913 | Sanford |
| 1,091,392 A | 3/1914 | Schlichtinger |
| 1,107,206 A | 8/1914 | Schwartzburg |
| 1,136,092 A | 4/1915 | Blumere |
| 1,181,045 A | 4/1916 | Tessier |
| 1,251,935 A | 1/1918 | Stevens |
| 1,265,481 A | 5/1918 | Mosby |
| 1,377,111 A | 5/1921 | Blair |
| 1,391,353 A | 9/1921 | Wells |
| 1,423,547 A | 7/1922 | Strohbach |
| 1,426,508 A | 8/1922 | Rollings |
| 1,434,831 A | 11/1922 | Long |
| D62,888 S | 8/1923 | Davis, Jr. et al. |
| D62,916 S | 8/1923 | Peck |
| 1,472,667 A | 10/1923 | Nelson |
| D65,772 S | 10/1924 | Caltis |
| 1,521,782 A | 1/1925 | Meier |
| 1,538,480 A | 5/1925 | Gallagher |
| 1,555,407 A | 9/1925 | Ferris |
| 1,557,068 A | 10/1925 | Lee |
| 1,558,316 A | 10/1925 | Tipple |
| 1,566,571 A | 12/1925 | Appleton |
| D71,107 S | 9/1926 | Gorowitz |
| 1,623,439 A | 4/1927 | Rawlings |
| 1,634,569 A | 7/1927 | Bray |
| 1,634,648 A | 7/1927 | Cardinet |
| 1,644,063 A | 10/1927 | Kircher |
| D76,001 S | 8/1928 | Broch |
| 1,682,575 A | 8/1928 | Leon et al. |
| D81,602 S | 7/1930 | Teague |
| 1,791,956 A | 2/1931 | Cowles |
| D84,104 S | 5/1931 | Rithner |
| 1,858,087 A | 5/1932 | Howard |
| D87,460 S | 8/1932 | Cook |
| 1,891,042 A | 12/1932 | Benoit |
| 1,905,856 A | 4/1933 | Haase et al. |
| D95,019 S | 4/1935 | Cooperstein |
| 2,000,609 A | 5/1935 | Pitman |
| D102,532 S | 12/1936 | Vuillemenot |
| D105,812 S | 8/1937 | Siekert |
| D115,321 S | 6/1939 | Pueschel |
| D121,675 S | 7/1940 | Goldin |
| D126,997 S | 5/1941 | Bentzen et al. |
| D130,923 S | 12/1941 | Philipovich |
| 2,267,883 A | 12/1941 | Wood |
| D132,522 S | 5/1942 | Fuerst et al. |
| 2,350,922 A | 6/1944 | Planeta |
| D140,392 S | 2/1945 | Haynes |
| 2,417,178 A | 3/1947 | Ritter |
| 2,432,632 A | 12/1947 | Seibel |
| D149,729 S | 5/1948 | Aronek |
| D153,759 S | 5/1949 | Blatt |
| 2,475,207 A | 7/1949 | Smith |
| 2,510,721 A | 6/1950 | Smith |
| 2,570,733 A | 10/1951 | Thomas |
| D165,628 S | 1/1952 | Blazier |
| 2,641,086 A | 6/1953 | Stephen |
| D170,150 S | 8/1953 | Kowap |
| D173,658 S | 12/1954 | Jones |
| 2,696,803 A | 12/1954 | Deffenbaugh |
| D174,139 S | 3/1955 | Sadler |
| D174,909 S | 6/1955 | Kllegberg |
| D175,435 S | 8/1955 | Moffat |
| 2,725,663 A | 12/1955 | Mullen |
| D178,917 S | 10/1956 | England et al. |
| 2,786,446 A | 3/1957 | Newman |
| 2,804,844 A | 9/1957 | Gigliotti |
| 2,887,987 A | 5/1959 | Fitzgerald et al. |
| 2,891,508 A | 6/1959 | Bower |
| 2,944,516 A | 7/1960 | Malloy, Sr. |
| 2,971,671 A | 2/1961 | Shakman |
| 2,987,041 A | 6/1961 | Bard |
| 3,022,768 A | 2/1962 | Lynch |
| D192,435 S | 3/1962 | Goodman |
| 3,050,619 A | 8/1962 | Abramson |
| 3,051,126 A | 8/1962 | Merritt et al. |
| 3,051,303 A | 8/1962 | Daanen |
| D193,558 S | 9/1962 | Parry |
| D194,846 S | 3/1963 | Perry |
| 3,089,605 A | 5/1963 | Buonauro |
| 3,090,354 A | 5/1963 | Merritt et al. |
| D196,777 S | 11/1963 | Haynes |
| 3,125,069 A | 3/1964 | Fowler |
| 3,136,296 A | 6/1964 | Luin |
| 3,145,690 A | 8/1964 | Bachman |
| D200,472 S | 3/1965 | Chang |
| D200,778 S | 4/1965 | Pregont |
| 3,244,150 A | 4/1966 | Benton |
| D205,772 S | 9/1966 | Blair |
| 3,272,467 A | 9/1966 | Kassube |
| 3,307,602 A | 3/1967 | Boster |
| 3,316,884 A | 5/1967 | Viggars |
| 3,372,676 A | 3/1968 | Williams |
| D212,276 S | 9/1968 | Lodding et al. |
| D214,172 S | 5/1969 | Troutman |
| D216,361 S | 12/1969 | Pappas, Jr. |
| 3,491,724 A | 1/1970 | Sunner |
| D217,470 S | 5/1970 | Morrow |
| 3,526,335 A | 9/1970 | Swett et al. |
| 3,634,678 A | 1/1972 | Glass et al. |
| D230,295 S | 2/1974 | Rosenwach |
| D230,948 S | 3/1974 | Moon |
| D234,180 S | 1/1975 | Dart et al. |
| D234,615 S | 3/1975 | Kilham |
| D236,139 S | 7/1975 | Kilham |
| 3,901,192 A | 8/1975 | Adams |
| 3,913,527 A | 10/1975 | Kilham |
| 3,928,936 A | 12/1975 | Wollen |
| D239,182 S | 3/1976 | Kilham |
| D240,176 S | 6/1976 | Friedman |
| D241,149 S | 8/1976 | Miller et al. |
| 3,977,363 A | 8/1976 | Fisher, Jr. |
| D241,860 S | 10/1976 | Calamia |
| D244,009 S | 4/1977 | Kayne |
| D244,098 S | 4/1977 | Kilham |
| D244,786 S | 6/1977 | Dryden |
| 4,030,451 A | 6/1977 | Miller |
| 4,037,361 A | 7/1977 | Murphy et al. |
| D245,349 S | 8/1977 | Fisher, Jr. |
| D245,643 S | 8/1977 | Orfei |
| D245,927 S | 9/1977 | Edwards et al. |
| D246,294 S | 11/1977 | Hetherington |
| 4,082,872 A | 4/1978 | Hughes |
| 4,085,706 A | 4/1978 | Evans |
| D248,006 S | 5/1978 | Christian |
| 4,102,308 A | 7/1978 | Kilham |
| 4,144,842 A | 3/1979 | Schlising |
| D252,288 S | 7/1979 | Kilham |
| D253,706 S | 12/1979 | Bardeau |
| 4,188,913 A | 2/1980 | Earl et al. |
| 4,223,637 A | 9/1980 | Keefe |
| D258,338 S | 2/1981 | Gersin |
| D259,143 S | 5/1981 | Aktinson |
| D259,763 S | 7/1981 | Dickinson |
| D260,608 S | 9/1981 | McKee, Jr. |
| D260,843 S | 9/1981 | Laird et al. |
| 4,327,669 A | 5/1982 | Blasbalg |
| 4,328,605 A | 5/1982 | Hutchison et al. |
| D264,813 S | 6/1982 | Potter |
| D266,611 S | 10/1982 | Metts et al. |
| 4,361,116 A | 11/1982 | Kilham |
| D267,355 S | 12/1982 | Blasbalg |
| 4,369,216 A | 1/1983 | Willinger |

(56) References Cited

U.S. PATENT DOCUMENTS

| | | | |
|---|---|---|---|
| D268,056 S | 2/1983 | Campbell-Kelly et al. |
| 4,389,975 A | 6/1983 | Fisher, Jr. |
| 4,395,015 A | 7/1983 | Reardon |
| D271,434 S | 11/1983 | Love |
| D272,507 S | 2/1984 | Conti |
| D272,508 S | 2/1984 | Conti |
| D273,429 S | 4/1984 | Kilham |
| 4,441,458 A | 4/1984 | Mercil |
| 4,444,324 A | 4/1984 | Grenell |
| D274,563 S | 7/1984 | Blasbalg |
| D277,514 S | 2/1985 | Bescherer |
| D277,703 S | 2/1985 | Kilham |
| D277,988 S | 3/1985 | Kilham |
| D278,168 S | 3/1985 | Latham et al. |
| D278,751 S | 5/1985 | Seager |
| D279,456 S | 7/1985 | Fortuna |
| D280,559 S | 9/1985 | Bentall |
| D281,768 S | 12/1985 | Hansen, Jr. |
| D282,019 S | 12/1985 | Kilham |
| D284,033 S | 5/1986 | Brodsky |
| 4,588,618 A | 5/1986 | Wolfe |
| D285,840 S | 9/1986 | Poon |
| D287,652 S | 1/1987 | Mack |
| D288,353 S | 2/1987 | Smith |
| D289,210 S | 4/1987 | Tucker et al. |
| D289,211 S | 4/1987 | Riha |
| 4,664,066 A | 5/1987 | Steuernagel et al. |
| D290,769 S | 7/1987 | Taylor |
| D290,773 S | 7/1987 | Liethen |
| 4,691,665 A | 9/1987 | Hefner |
| D292,372 S | 10/1987 | Sykes |
| 4,702,198 A | 10/1987 | Holyoak |
| 4,708,892 A | 11/1987 | Young et al. |
| 4,712,512 A | 12/1987 | Schreib et al. |
| 4,732,112 A | 3/1988 | Fenner et al. |
| D297,297 S | 8/1988 | Lacey |
| 4,789,572 A | 12/1988 | Weaver |
| 4,798,172 A | 1/1989 | Clarke |
| D299,770 S | 2/1989 | Coffer |
| 4,821,681 A | 4/1989 | Tucker |
| D304,536 S | 11/1989 | Blaser |
| 4,896,628 A | 1/1990 | Kadunce |
| 4,901,673 A | 2/1990 | Overstreet |
| D309,639 S | 7/1990 | Knudsen |
| D309,640 S | 7/1990 | Knudsen |
| 4,938,168 A | 7/1990 | Meidell |
| D309,858 S | 8/1990 | Meyersburg |
| 4,974,547 A | 12/1990 | Graham |
| 4,977,859 A * | 12/1990 | Kilham ............... A01K 39/012 119/52.2 |
| D314,253 S | 1/1991 | Goetz |
| 4,980,990 A | 1/1991 | Hiday |
| 4,986,219 A | 1/1991 | Harris |
| 4,996,947 A | 3/1991 | Petrides |
| 5,016,791 A | 5/1991 | Burow |
| 5,033,411 A | 7/1991 | Brucker |
| D319,389 S | 8/1991 | Halm |
| 5,040,698 A | 8/1991 | Ramsey et al. |
| 5,062,388 A * | 11/1991 | Kilham ............... A01K 39/012 119/52.2 |
| 5,062,390 A | 11/1991 | Bescherer et al. |
| D322,044 S | 12/1991 | Marsar et al. |
| 5,083,881 A | 1/1992 | Yoshinaga |
| D324,436 S | 3/1992 | Embree |
| 5,105,765 A | 4/1992 | Loken |
| D326,003 S | 5/1992 | Embree |
| 5,140,945 A | 8/1992 | Barnhart et al. |
| D329,892 S | 9/1992 | Brister |
| D331,647 S | 12/1992 | Embree |
| D331,864 S | 12/1992 | Sciubba |
| 5,168,830 A | 12/1992 | Deglis |
| 5,183,005 A | 2/1993 | Tyler |
| 5,191,857 A | 3/1993 | Boaz |
| 5,195,463 A | 3/1993 | Lorenzana et al. |
| D334,635 S | 4/1993 | Wenstrand |
| 5,207,180 A | 5/1993 | Graham |
| D337,271 S | 7/1993 | Pezzoli et al. |
| D337,614 S | 7/1993 | Turner |
| D338,317 S | 8/1993 | Woodward |
| 5,247,904 A | 9/1993 | Anderson |
| 5,269,242 A | 12/1993 | Toldi |
| D343,030 S | 1/1994 | Harwick, Jr. |
| D344,390 S | 2/1994 | May et al. |
| D345,444 S | 3/1994 | Kestekides-Kesdekoglu |
| 5,289,796 A | 3/1994 | Armstrong |
| 5,291,855 A | 3/1994 | Laverty |
| D346,745 S | 5/1994 | Heynen et al. |
| D347,714 S | 6/1994 | Maple et al. |
| D349,981 S | 8/1994 | Fasino |
| D351,391 S | 10/1994 | Lipton |
| D351,692 S | 10/1994 | Cossey |
| 5,361,723 A | 11/1994 | Burleigh |
| D355,006 S | 1/1995 | Lo |
| D360,495 S | 7/1995 | Sanderson |
| D360,710 S | 7/1995 | Colwell |
| D360,829 S | 8/1995 | Leeds |
| 5,450,816 A | 9/1995 | Santa Cruz |
| D365,411 S | 12/1995 | Yan |
| D366,413 S | 1/1996 | Tober |
| 5,479,879 A | 1/1996 | Biek |
| D367,614 S | 3/1996 | Pagarani |
| D368,337 S | 3/1996 | Dickinson |
| D368,989 S | 4/1996 | Prehart |
| 5,507,249 A | 4/1996 | Shaw |
| D370,313 S | 5/1996 | Nottingham et al. |
| D370,634 S | 6/1996 | Mero et al. |
| D371,230 S | 6/1996 | Nottingham et al. |
| 5,522,758 A | 6/1996 | Liu |
| D371,401 S | 7/1996 | Nielsen et al. |
| D371,838 S | 7/1996 | Davis et al. |
| D371,979 S | 7/1996 | Nottingham et al. |
| 5,533,467 A | 7/1996 | Lancia |
| 5,558,040 A * | 9/1996 | Colwell ............... A01K 39/012 119/52.2 |
| 5,564,226 A | 10/1996 | Paramest |
| D376,731 S | 12/1996 | Lin |
| D378,312 S | 3/1997 | Davis, Jr. |
| D380,066 S | 6/1997 | Green et al. |
| 5,638,638 A | 6/1997 | Moskowitz |
| D382,376 S | 8/1997 | Bescherer |
| 5,655,477 A | 8/1997 | Hoffman et al. |
| D383,878 S | 9/1997 | Merino et al. |
| 5,678,600 A | 10/1997 | Locke et al. |
| D386,811 S | 11/1997 | Milicia |
| D386,835 S | 11/1997 | Passamare |
| D386,836 S | 11/1997 | Hunt |
| 5,682,835 A | 11/1997 | Walter et al. |
| D387,156 S | 12/1997 | Johnson |
| D388,235 S | 12/1997 | Wilson et al. |
| 5,701,841 A | 12/1997 | Fasino |
| 5,711,247 A | 1/1998 | Henshaw |
| D392,763 S | 3/1998 | Denison |
| 5,722,344 A | 3/1998 | Rank |
| D394,468 S | 5/1998 | Leadbetter |
| D395,840 S | 7/1998 | Cato |
| 5,775,256 A | 7/1998 | Henshaw |
| 5,782,200 A | 7/1998 | Knowles et al. |
| D397,529 S | 8/1998 | Fuller et al. |
| 5,800,047 A | 9/1998 | Yang |
| 5,806,460 A | 9/1998 | Klein |
| D399,611 S | 10/1998 | Ericson et al. |
| 5,816,686 A | 10/1998 | Wang et al. |
| 5,823,135 A | 10/1998 | Gilchrist et al. |
| 5,829,382 A | 11/1998 | Garrison |
| 5,845,605 A | 12/1998 | Malamphy |
| 5,848,493 A | 12/1998 | Gasper |
| D406,307 S | 3/1999 | Kang |
| D408,420 S | 4/1999 | Buter |
| D410,096 S | 5/1999 | Majerowski |
| 5,899,555 A | 5/1999 | Lin |
| D410,592 S | 6/1999 | Niemiec |
| D412,226 S | 7/1999 | Bellehumer |
| 5,947,054 A | 9/1999 | Liethen |
| D417,326 S | 11/1999 | Greene |

(56) References Cited

U.S. PATENT DOCUMENTS

| | | |
|---|---|---|
| D417,528 S | 12/1999 | Rizzo |
| 6,012,414 A | 1/2000 | Klein |
| D421,643 S | 3/2000 | Mauk |
| D423,166 S | 4/2000 | Hornyak |
| D423,722 S | 4/2000 | Lang |
| D425,259 S | 5/2000 | Lang |
| 6,079,361 A | 6/2000 | Bowell et al. |
| D428,537 S | 7/2000 | Miller |
| D429,852 S | 8/2000 | Hogarty |
| 6,095,087 A | 8/2000 | Bloedorn |
| 6,119,627 A | 9/2000 | Banyas et al. |
| D431,760 S | 10/2000 | Sullivan |
| D433,633 S | 11/2000 | La Fata |
| D433,747 S | 11/2000 | Frampton |
| 6,145,477 A | 11/2000 | Jansen |
| D434,980 S | 12/2000 | Suziki |
| D438,360 S | 2/2001 | Robinson |
| D440,002 S | 4/2001 | Miranda |
| D440,361 S | 4/2001 | Colwell |
| D440,677 S | 4/2001 | Long et al. |
| 6,213,054 B1 | 4/2001 | Marshall |
| D443,711 S | 6/2001 | Lindsay |
| D445,525 S | 7/2001 | Pan |
| D445,533 S | 7/2001 | Arnoldo |
| D445,939 S | 7/2001 | Pan |
| 6,253,706 B1 | 7/2001 | Sloop |
| D448,290 S | 9/2001 | Schultz et al. |
| 6,305,321 B1 | 10/2001 | Potente |
| D450,786 S | 11/2001 | Jenkins et al. |
| D451,237 S | 11/2001 | Dolan |
| D451,997 S | 12/2001 | Schwartz |
| D454,192 S | 3/2002 | Frampton |
| D454,636 S | 3/2002 | Lantz |
| D454,669 S | 3/2002 | Lieb |
| 6,360,690 B1 | 3/2002 | Canby |
| D459,824 S | 7/2002 | Leen |
| D460,591 S | 7/2002 | Skalka |
| D460,592 S | 7/2002 | Skalka |
| 6,415,737 B2 | 7/2002 | Banyas et al. |
| 6,418,878 B1 | 7/2002 | Cathell et al. |
| D461,827 S | 8/2002 | Koebbe |
| 6,427,629 B1 | 8/2002 | Lush |
| 6,439,158 B1 | 8/2002 | Blohm |
| 6,450,120 B1 | 9/2002 | Nylen |
| D464,184 S | 10/2002 | Skalka |
| D466,255 S | 11/2002 | Kuelbs |
| D466,656 S | 12/2002 | Kuelbs et al. |
| 6,499,430 B2 | 12/2002 | Garcia-Lucio et al. |
| D470,621 S | 2/2003 | Cheng |
| D470,630 S | 2/2003 | Kuelbs |
| D471,096 S | 3/2003 | Thorne et al. |
| D471,327 S | 3/2003 | Kuelbs |
| D473,739 S | 4/2003 | Lenger |
| 6,543,384 B2 | 4/2003 | Cote |
| 6,546,894 B2 | 4/2003 | Chrisco et al. |
| 6,561,128 B1 | 5/2003 | Carter |
| D476,755 S | 7/2003 | LoVullo et al. |
| 6,584,933 B1 | 7/2003 | Stone |
| 6,591,781 B2 | 7/2003 | Hardison |
| D478,475 S | 8/2003 | Backes et al. |
| D479,595 S | 9/2003 | Curtin |
| D479,596 S | 9/2003 | Curtin |
| D479,597 S | 9/2003 | Curtin |
| D480,135 S | 9/2003 | Frampton |
| 6,622,654 B2 | 9/2003 | Fasino |
| D480,802 S | 10/2003 | Frampton |
| D480,803 S | 10/2003 | Frampton |
| D482,562 S | 11/2003 | Demers |
| D482,736 S | 11/2003 | Manville |
| D483,529 S | 12/2003 | Fort, II |
| D483,858 S | 12/2003 | Lin |
| 6,659,041 B1 | 12/2003 | Curts |
| 6,662,747 B1 | 12/2003 | Wydra |
| D485,208 S | 1/2004 | Fan |
| D485,345 S | 1/2004 | Bucher |
| D485,350 S | 1/2004 | Frampton |
| D485,351 S | 1/2004 | Frampton |
| D485,387 S | 1/2004 | Harbaugh |
| D485,928 S | 1/2004 | Leung et al. |
| D485,930 S | 1/2004 | Chen |
| 6,672,249 B2 | 1/2004 | Garcia-Lucio et al. |
| 6,701,867 B1 | 3/2004 | Garrison |
| D488,195 S | 4/2004 | Manville |
| D488,219 S | 4/2004 | Frampton |
| D488,901 S | 4/2004 | Skalka |
| D489,128 S | 4/2004 | Frampton |
| D490,576 S | 5/2004 | Rich et al. |
| 6,733,151 B2 | 5/2004 | Shu |
| D490,745 S | 6/2004 | Fan |
| D491,019 S | 6/2004 | Marsden et al. |
| D491,657 S | 6/2004 | Cartwright |
| D493,053 S | 7/2004 | Snell |
| 6,776,511 B1 | 8/2004 | Lindsay |
| D495,839 S | 9/2004 | Muday et al. |
| D495,900 S | 9/2004 | Mayse |
| 6,789,916 B2 | 9/2004 | Ruggles |
| 6,792,891 B1 | 9/2004 | Coburn et al. |
| D497,226 S | 10/2004 | Nauert |
| D497,406 S | 10/2004 | King |
| D497,458 S | 10/2004 | Nauert |
| 6,830,009 B1 | 12/2004 | Kuelbs |
| D501,805 S | 2/2005 | Opiniano |
| D502,293 S | 2/2005 | Harger |
| D502,294 S | 2/2005 | Hung |
| D503,019 S | 3/2005 | Swift et al. |
| 6,860,229 B1 | 3/2005 | Craft |
| 6,861,108 B1 | 3/2005 | Potoroka, Sr. |
| 6,866,004 B1 | 3/2005 | Lush |
| D504,547 S | 4/2005 | Nauert |
| D504,746 S | 5/2005 | Lee |
| D505,521 S | 5/2005 | Schrodt |
| D505,755 S | 5/2005 | Lundstrom et al. |
| 6,890,155 B2 | 5/2005 | Cartwright |
| 6,895,894 B2 | 5/2005 | Fort, II |
| D506,826 S | 6/2005 | Frampton |
| 6,901,882 B2 | 6/2005 | Kuelbs |
| D509,325 S | 9/2005 | Jung et al. |
| D509,748 S | 9/2005 | Carmichael et al. |
| 6,945,192 B2 | 9/2005 | Cote |
| D510,992 S | 10/2005 | Bucher |
| D511,866 S | 11/2005 | Lundstrom et al. |
| D512,800 S | 12/2005 | Jung et al. |
| D513,188 S | 12/2005 | Bertrand |
| 6,986,322 B2 | 1/2006 | Lumpkin et al. |
| D514,749 S | 2/2006 | Fort et al. |
| D515,916 S | 2/2006 | Bleuer |
| D516,712 S | 3/2006 | Pickett |
| D516,946 S | 3/2006 | Opiniano |
| 7,017,517 B2 | 3/2006 | Paquette |
| 7,017,521 B2 | 3/2006 | Kuelbs |
| D518,380 S | 4/2006 | Moran |
| 7,021,241 B2 | 4/2006 | Nock |
| 7,040,251 B2 | 5/2006 | Fort, II |
| D523,141 S | 6/2006 | Massey |
| D523,955 S | 6/2006 | Badarello |
| D524,490 S | 7/2006 | Obenshain |
| D525,903 S | 8/2006 | Weiser et al. |
| 7,096,821 B2 | 8/2006 | Ruff |
| D529,220 S | 9/2006 | Izardel |
| D530,457 S | 10/2006 | Jung et al. |
| D532,132 S | 11/2006 | Holsinger et al. |
| 7,168,392 B2 | 1/2007 | Kuelbs |
| D536,838 S | 2/2007 | Colvin et al. |
| D538,485 S | 3/2007 | Degironne |
| D538,583 S | 3/2007 | Schuler |
| 7,185,605 B1 | 3/2007 | Lush |
| D540,349 S | 4/2007 | Waki |
| D541,466 S | 4/2007 | Bucher et al. |
| D542,479 S | 5/2007 | O'Dell |
| D542,659 S | 5/2007 | Meether et al. |
| D543,256 S | 5/2007 | Chen |
| D543,665 S | 5/2007 | Hewitt et al. |
| D544,942 S | 6/2007 | Chen |
| 7,234,416 B2 | 6/2007 | Hoff |

(56) References Cited

U.S. PATENT DOCUMENTS

| | | |
|---|---|---|
| 7,234,418 B2 | 6/2007 | Fort et al. |
| D545,984 S | 7/2007 | Leung et al. |
| D546,991 S | 7/2007 | Poon |
| 7,237,507 B1 * | 7/2007 | Colwell ............ A01K 39/0113 |
| | | 119/51.01 |
| D548,321 S | 8/2007 | Orozco |
| D548,587 S | 8/2007 | DuVal et al. |
| 7,258,075 B1 | 8/2007 | Jones et al. |
| 7,261,055 B2 | 8/2007 | Nock |
| D553,821 S | 10/2007 | Skalka |
| D554,252 S | 10/2007 | Bucher et al. |
| 7,287,486 B2 | 10/2007 | Hunter |
| 7,302,538 B2 | 11/2007 | Liu et al. |
| D556,568 S | 12/2007 | DuVal |
| D559,472 S | 1/2008 | Abinanti et al. |
| D561,021 S | 2/2008 | DuVal et al. |
| D561,040 S | 2/2008 | Sequeira |
| D563,608 S | 3/2008 | Kitchen |
| D563,616 S | 3/2008 | Lynde et al. |
| D565,173 S | 3/2008 | Bucher et al. |
| D567,098 S | 4/2008 | Sequeira |
| D568,754 S | 5/2008 | Sequeira |
| D569,301 S | 5/2008 | Fotherby |
| 7,370,607 B2 | 5/2008 | O'Dell |
| 7,373,901 B2 | 5/2008 | Baynard |
| D572,145 S | 7/2008 | Knapp et al. |
| D572,866 S | 7/2008 | Bloedorn |
| D573,769 S | 7/2008 | Skalka |
| 7,396,212 B1 | 7/2008 | Parker et al. |
| D575,118 S | 8/2008 | Bignon |
| D575,591 S | 8/2008 | Bonetti |
| D575,864 S | 8/2008 | Parker et al. |
| 7,409,922 B1 | 8/2008 | Baynard et al. |
| 7,448,346 B1 | 11/2008 | Stone et al. |
| 7,448,347 B2 | 11/2008 | Richmond |
| D584,387 S | 1/2009 | Lee et al. |
| D585,625 S | 1/2009 | Gray |
| D586,228 S | 2/2009 | McWillis |
| 7,484,475 B2 | 2/2009 | Milliner |
| D587,941 S | 3/2009 | Singh |
| D588,756 S | 3/2009 | Colvin et al. |
| 7,503,282 B1 | 3/2009 | Lush |
| 7,506,611 B1 | 3/2009 | Lush |
| 7,516,716 B2 | 4/2009 | Puckett et al. |
| D591,589 S | 5/2009 | Myers et al. |
| D592,046 S | 5/2009 | Myers et al. |
| 7,530,330 B1 | 5/2009 | Valle |
| D593,649 S | 6/2009 | Marvell |
| 7,540,260 B2 | 6/2009 | Rich et al. |
| 7,540,262 B2 | 6/2009 | Kuelbs |
| 7,549,394 B2 | 6/2009 | Nock |
| D595,525 S | 7/2009 | Dimond |
| D596,033 S | 7/2009 | Zach et al. |
| D597,197 S | 7/2009 | Parker et al. |
| D598,238 S | 8/2009 | Durdon et al. |
| D599,159 S | 9/2009 | Stein |
| D599,899 S | 9/2009 | Thompson |
| D600,861 S | 9/2009 | Sin |
| D601,309 S | 9/2009 | Babal |
| 7,600,487 B2 | 10/2009 | Stone et al. |
| D604,436 S | 11/2009 | Poon |
| 7,610,875 B2 | 11/2009 | Webber |
| D606,369 S | 12/2009 | Ruzycky |
| D606,447 S | 12/2009 | West et al. |
| D606,708 S | 12/2009 | McMullen |
| D606,709 S | 12/2009 | McMullen |
| D606,878 S | 12/2009 | Lindfors |
| D607,612 S | 1/2010 | Yang |
| D609,329 S | 2/2010 | Parker et al. |
| D609,864 S | 2/2010 | Tsai |
| 7,654,225 B2 | 2/2010 | Madsen et al. |
| D612,549 S | 3/2010 | Garcia-Lucio et al. |
| 7,669,553 B2 | 3/2010 | White et al. |
| 7,685,969 B2 | 3/2010 | Stone et al. |
| D614,825 S | 4/2010 | Biegel |
| D615,310 S | 5/2010 | Cybulski |
| 7,721,676 B2 | 5/2010 | Bloedorn |
| D618,733 S | 6/2010 | Kessler |
| 7,726,259 B2 | 6/2010 | Hepp et al. |
| 7,739,982 B2 | 6/2010 | Cote |
| 7,743,732 B2 | 6/2010 | Webber |
| D620,172 S | 7/2010 | Orozco |
| D623,005 S | 9/2010 | Cheng |
| D623,805 S | 9/2010 | Vosbikian |
| D623,806 S | 9/2010 | Modi et al. |
| D624,352 S | 9/2010 | Lion et al. |
| 7,789,040 B2 | 9/2010 | Liethen |
| 7,798,099 B2 | 9/2010 | Vosbikian |
| D627,457 S | 11/2010 | Klausing et al. |
| 7,827,936 B1 | 11/2010 | Puckett et al. |
| D629,137 S | 12/2010 | Chen |
| D630,969 S | 1/2011 | Mattis |
| D631,149 S | 1/2011 | Fis-Menache |
| 7,861,671 B2 | 1/2011 | Carter et al. |
| 7,874,264 B2 * | 1/2011 | McMullen ........... A01K 39/012 |
| | | 119/52.2 |
| 7,886,695 B2 | 2/2011 | Held et al. |
| D633,659 S | 3/2011 | Lai |
| D636,238 S | 4/2011 | Elmelund |
| D636,539 S | 4/2011 | Montoya |
| D636,946 S | 4/2011 | Able |
| 7,930,994 B2 | 4/2011 | Stone et al. |
| D637,448 S | 5/2011 | Cheng |
| D638,588 S | 5/2011 | Vosbikian |
| 7,946,248 B2 | 5/2011 | Colwell et al. |
| 7,946,249 B2 | 5/2011 | Colvin et al. |
| 7,946,734 B2 | 5/2011 | Laporte |
| 7,958,845 B2 | 6/2011 | Gardner |
| D641,261 S | 7/2011 | Diss et al. |
| D641,516 S | 7/2011 | Chen |
| D643,442 S | 8/2011 | Sato et al. |
| D643,855 S | 8/2011 | Taniguchi et al. |
| D644,052 S | 8/2011 | Kraemer |
| 7,997,434 B2 | 8/2011 | Benetti |
| 8,006,642 B2 | 8/2011 | Vosbikian |
| 8,006,946 B2 | 8/2011 | Bonnema |
| D644,469 S | 9/2011 | Kraemer |
| 8,011,323 B2 | 9/2011 | Vaughn et al. |
| D649,299 S | 11/2011 | Lush |
| D649,302 S | 11/2011 | Hickok |
| D649,471 S | 11/2011 | Guglielmo et al. |
| 8,051,803 B2 | 11/2011 | Gauker et al. |
| D650,514 S | 12/2011 | Lin et al. |
| D650,690 S | 12/2011 | Guglielmo et al. |
| D652,059 S | 1/2012 | Sato et al. |
| D652,343 S | 1/2012 | Hunter et al. |
| D652,742 S | 1/2012 | Diss |
| D652,972 S | 1/2012 | Lee |
| D653,011 S | 1/2012 | Myers |
| D653,124 S | 1/2012 | Diss |
| D653,562 S | 2/2012 | Ziegler et al. |
| D653,563 S | 2/2012 | Ziegler et al. |
| D656,279 S | 3/2012 | Tu |
| D656,690 S | 3/2012 | Tu |
| D657,399 S | 4/2012 | Nemoto |
| 8,156,894 B1 | 4/2012 | Krah |
| D658,684 S | 5/2012 | Roman |
| D658,930 S | 5/2012 | Munari |
| D661,434 S | 6/2012 | Fields et al. |
| D662,652 S | 6/2012 | Browder |
| D664,437 S | 7/2012 | Barel |
| 8,230,809 B2 | 7/2012 | Cote |
| D665,627 S | 8/2012 | De Winter |
| 8,245,666 B2 | 8/2012 | Sena et al. |
| 8,272,607 B2 | 9/2012 | Bonnema |
| D670,042 S | 10/2012 | Anderson |
| 8,276,541 B2 | 10/2012 | LoRocco et al. |
| D670,836 S | 11/2012 | Hisey et al. |
| D671,276 S | 11/2012 | Krueger |
| D671,277 S | 11/2012 | Vosbikian et al. |
| D671,692 S | 11/2012 | Carter |
| 8,316,800 B2 | 11/2012 | Puckett et al. |
| D673,722 S | 1/2013 | Cartwright |
| D673,727 S | 1/2013 | Cartwright |

(56) References Cited

U.S. PATENT DOCUMENTS

| | | |
|---|---|---|
| 8,347,818 B2 | 1/2013 | Cowger et al. |
| 8,360,005 B1 | 1/2013 | Allen |
| D676,614 S | 2/2013 | Fields et al. |
| D677,016 S | 2/2013 | Carter |
| D678,628 S | 3/2013 | Krueger |
| D679,453 S | 4/2013 | Krueger et al. |
| 8,413,605 B2 | 4/2013 | Baynard et al. |
| D682,481 S | 5/2013 | Krueger |
| D682,482 S | 5/2013 | Nelson |
| D683,909 S | 6/2013 | Muhr et al. |
| D685,603 S | 7/2013 | Mishan |
| D689,730 S | 9/2013 | Goto et al. |
| D692,191 S | 10/2013 | Stephens et al. |
| D698,098 S | 1/2014 | Muhr et al. |
| D704,385 S | 5/2014 | Hoofman |
| D709,317 S | 7/2014 | Cheng |
| D710,686 S | 8/2014 | Gowens |
| D711,679 S | 8/2014 | Day et al. |
| D713,101 S | 9/2014 | Bruno et al. |
| D715,091 S | 10/2014 | Thun et al. |
| D715,092 S | 10/2014 | Thun et al. |
| D715,588 S | 10/2014 | Thun et al. |
| D720,506 S | 12/2014 | Bruno et al. |
| D744,172 S | 11/2015 | Donegan et al. |
| D756,570 S | 5/2016 | Donegan et al. |
| 2002/0121246 A1 | 9/2002 | Harman |
| 2003/0033985 A1 | 2/2003 | Hardison |
| 2003/0136347 A1 | 7/2003 | Fasino |
| 2003/0150390 A1 | 8/2003 | Rich et al. |
| 2003/0226514 A1 | 12/2003 | Cote |
| 2004/0010971 A1 | 1/2004 | Redfield et al. |
| 2004/0074397 A1 | 4/2004 | Calhoun |
| 2004/0118354 A1 | 6/2004 | Cox et al. |
| 2004/0134437 A1* | 7/2004 | Fort, II ............... A01K 39/012 119/57.8 |
| 2004/0231606 A1 | 11/2004 | Nock |
| 2004/0261726 A1 | 12/2004 | Lumpkin |
| 2005/0005865 A1 | 1/2005 | Rich et al. |
| 2005/0028743 A1 | 2/2005 | Wechsler |
| 2005/0120967 A1 | 6/2005 | Ruff |
| 2005/0120972 A1 | 6/2005 | Aboujaoude et al. |
| 2005/0127074 A1 | 6/2005 | Kusuma et al. |
| 2005/0178338 A1 | 8/2005 | Smith |
| 2005/0257749 A1 | 11/2005 | Kuelbs |
| 2005/0263085 A1 | 12/2005 | Rich |
| 2005/0268862 A1 | 12/2005 | Morrison |
| 2006/0005774 A1 | 1/2006 | Newman Bornhofen |
| 2006/0037546 A1 | 2/2006 | Jung et al. |
| 2006/0065202 A1 | 3/2006 | Fort et al. |
| 2006/0090391 A1 | 5/2006 | Huang |
| 2006/0090707 A1 | 5/2006 | Donegan |
| 2006/0096545 A1 | 5/2006 | Cone et al. |
| 2006/0117962 A1 | 6/2006 | Hoekstra et al. |
| 2006/0124067 A1 | 6/2006 | Taylor |
| 2006/0225658 A1 | 10/2006 | Baynard |
| 2006/0236591 A1 | 10/2006 | Cwiklinski et al. |
| 2006/0249946 A1 | 11/2006 | Gick |
| 2006/0254527 A1 | 11/2006 | Nock |
| 2006/0266295 A1 | 11/2006 | McDarren |
| 2006/0272585 A1 | 12/2006 | O'Dell |
| 2006/0288532 A1 | 12/2006 | Kim |
| 2007/0006813 A1 | 1/2007 | Smothers |
| 2007/0034160 A1 | 2/2007 | Nock |
| 2007/0108197 A1 | 5/2007 | Richardson et al. |
| 2007/0163506 A1 | 7/2007 | Bloedorn |
| 2007/0221133 A1 | 9/2007 | Richmond |
| 2007/0227454 A1 | 10/2007 | Fahey |
| 2008/0006212 A1 | 1/2008 | Ebert |
| 2008/0022936 A1 | 1/2008 | Stone et al. |
| 2008/0035068 A1 | 2/2008 | Gou |
| 2008/0105206 A1 | 5/2008 | Rich et al. |
| 2008/0127902 A1 | 6/2008 | Bent et al. |
| 2008/0134979 A1 | 6/2008 | Crocker |
| 2008/0190881 A1 | 8/2008 | Gardner |
| 2008/0210172 A1 | 9/2008 | Waikas |
| 2008/0244959 A1 | 10/2008 | Schinazi et al. |
| 2008/0251025 A1 | 10/2008 | Guay et al. |
| 2008/0257273 A1 | 10/2008 | Carter et al. |
| 2008/0302304 A1 | 12/2008 | Mayfield |
| 2009/0056633 A1 | 3/2009 | McDaniel et al. |
| 2009/0056636 A1 | 3/2009 | Deese et al. |
| 2009/0078211 A1 | 3/2009 | Charlton |
| 2009/0145875 A1 | 6/2009 | Gardner |
| 2009/0159008 A1* | 6/2009 | Humphries ........ A01K 39/0206 119/51.5 |
| 2009/0223456 A1 | 9/2009 | Hunter et al. |
| 2009/0229528 A1 | 9/2009 | McMurtry |
| 2009/0255475 A1* | 10/2009 | Black ................ A01K 39/0125 119/53 |
| 2009/0304876 A1 | 12/2009 | Weiss |
| 2009/0308321 A1 | 12/2009 | Szczygiel-Durante |
| 2009/0314221 A1 | 12/2009 | Wang |
| 2009/0320765 A1 | 12/2009 | Gauker et al. |
| 2010/0024738 A1 | 2/2010 | Chen et al. |
| 2010/0089330 A1 | 4/2010 | McMullen |
| 2010/0170447 A1 | 7/2010 | Pridgen, Jr. |
| 2010/0180828 A1 | 7/2010 | DeMichael |
| 2010/0218754 A1 | 9/2010 | Kuntz |
| 2010/0224132 A1 | 9/2010 | Gauker |
| 2010/0242848 A1 | 9/2010 | Vaughn, Jr. |
| 2010/0258054 A1 | 10/2010 | Frazier |
| 2010/0288200 A1 | 11/2010 | Lush |
| 2010/0300363 A1 | 12/2010 | Nangia |
| 2011/0011345 A1 | 1/2011 | LoRocco et al. |
| 2011/0067635 A1 | 3/2011 | Puckett et al. |
| 2011/0067637 A1 | 3/2011 | Baynard |
| 2011/0073043 A1 | 3/2011 | Dault |
| 2011/0083609 A1 | 4/2011 | Cote |
| 2011/0088626 A1 | 4/2011 | Hepp et al. |
| 2011/0094449 A1 | 4/2011 | George |
| 2011/0100299 A1 | 5/2011 | Colwell |
| 2011/0168101 A1 | 7/2011 | Guay et al. |
| 2011/0180004 A1 | 7/2011 | Humphries et al. |
| 2011/0214616 A1 | 9/2011 | Levin et al. |
| 2011/0239949 A1 | 10/2011 | Abbott |
| 2011/0297095 A1 | 12/2011 | Cruz |
| 2012/0055410 A1 | 3/2012 | Cote |
| 2012/0060762 A1 | 3/2012 | Cowger et al. |
| 2012/0167827 A1 | 7/2012 | Rochon |
| 2012/0216750 A1 | 8/2012 | Cruz |
| 2012/0234249 A1 | 9/2012 | Gaze |
| 2012/0285386 A1 | 11/2012 | Miller et al. |
| 2012/0311919 A1 | 12/2012 | Hardigree |
| 2013/0284102 A1 | 10/2013 | McCune |
| 2013/0291802 A1 | 11/2013 | Carpentieri |
| 2014/0060438 A1 | 3/2014 | Cote |

OTHER PUBLICATIONS 2010-2012 More Birds Bird Feeders & Nectar Product Catalog.
2010 Belle Fleur Wild Bird Products Catalog.
2011 Belle Fleur Wild Bird Products Catalog.
2010 Stokes Select Bird Feeders & Accessories Products Catalog: The most complete collection of bird feeding products.
2011 Stokes Select Bird Feeders & Accessories Products Catalog: The most complete collection of bird feeding products.
2008 Droll Yankees Products Catalog: The World's Best Bird Feeders and More.

\* cited by examiner

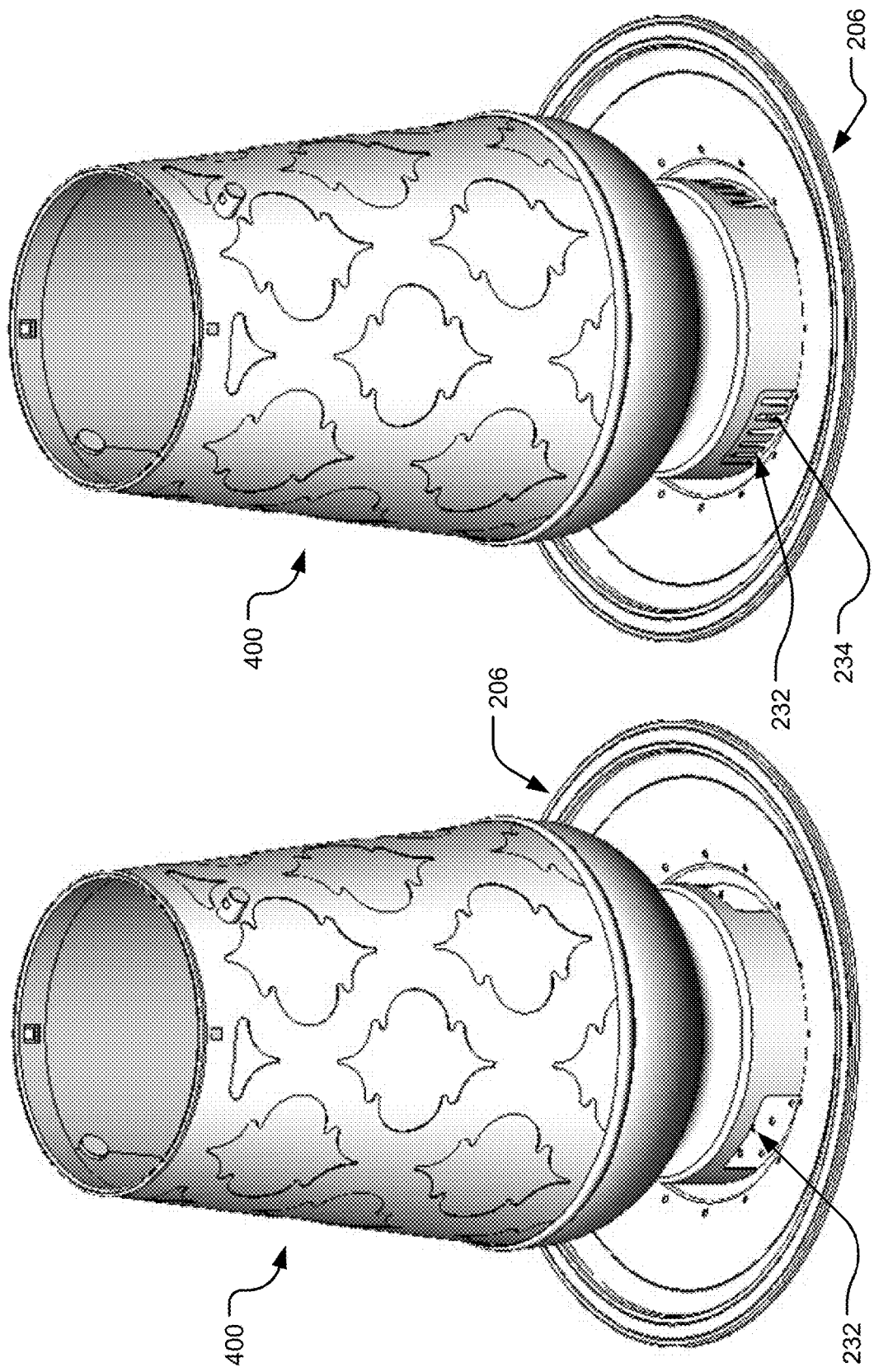

SMALL SEED CONVERTER FOR BIRD FEEDER

CROSS-REFERENCE TO RELATED APPLICATIONS

The present application claims benefit of priority under 35 U.S.C. § 119 to U.S. Provisional Patent Application No. 61/899,044, entitled "Bottle and Hanger for a Wild Bird Feeder" and filed on Nov. 1, 2013, which is specifically incorporated by reference in its entirety herein.

BACKGROUND

Many bird feeders configured to dispense seeds are difficult to clean and fill. Such bird feeders often have openings for receiving seed that are small and/or obstructed by components of the bird feeder, significantly increasing the challenge of filling the bird feeder without spilling the seed. Additionally, many bird feeders fail to adapt to a user's desire to attract different types of birds. For example, many bird feeders are only able to accommodate large seed or accommodate small seed. Accordingly, if the user purchases a large seed bird feeder and later wishes to attract birds that eat small seeds, the user must generally purchase another bird feeder entirely that is configured to dispense small seeds. Conventional bird feeders attempting to address these challenges often sacrifice appearance and quality of design, which is an important feature to users.

It is with these observations in mind, among others, that various aspects of the present disclosure were conceived and developed.

BRIEF SUMMARY

Implementations described and claimed herein address the foregoing problems by providing apparatuses and methods for facilitating filling and cleaning of bird feeders that are aesthetically pleasing and adaptable for attracting different types of birds. In one implementation, a bird feeder includes a port having a surface extending from a proximal end to a distal end. The proximal end has a connecting portion configured to connect to a reservoir. The surface has one or more openings defined therein. A small seed converter is insertable into the port, and the small seed converter includes a plurality of teeth extending from an edge. The plurality of teeth are configured to narrow the one or more openings for dispensing small sized seed.

In another implementation, a bird feeder includes a cap engaging portion, a mouth, and an elongated body. The cap engaging portion has a proximal opening defined by a proximal edge. The cap engaging portion has a proximal surface extending distally from the proximal edge with one or more proximal engagers disposed on the proximal surface. The one or more proximal engagers are configured to engage a hanger assembly. The mouth has a distal opening defined by a distal edge. The mouth has a distal surface extending proximally from the distal edge with one or more distal engagers disposed on the distal surface. The one or more distal engagers configured to engage a basin assembly. The elongated body extends between the cap engaging portion and the mouth.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 9A and 9B show isometric views of the bird feeder of FIG. 8A with the hanger assembly removed for clarity with a small seed converter removed and inserted, respectively.

DETAILED DESCRIPTION

Figure 1:
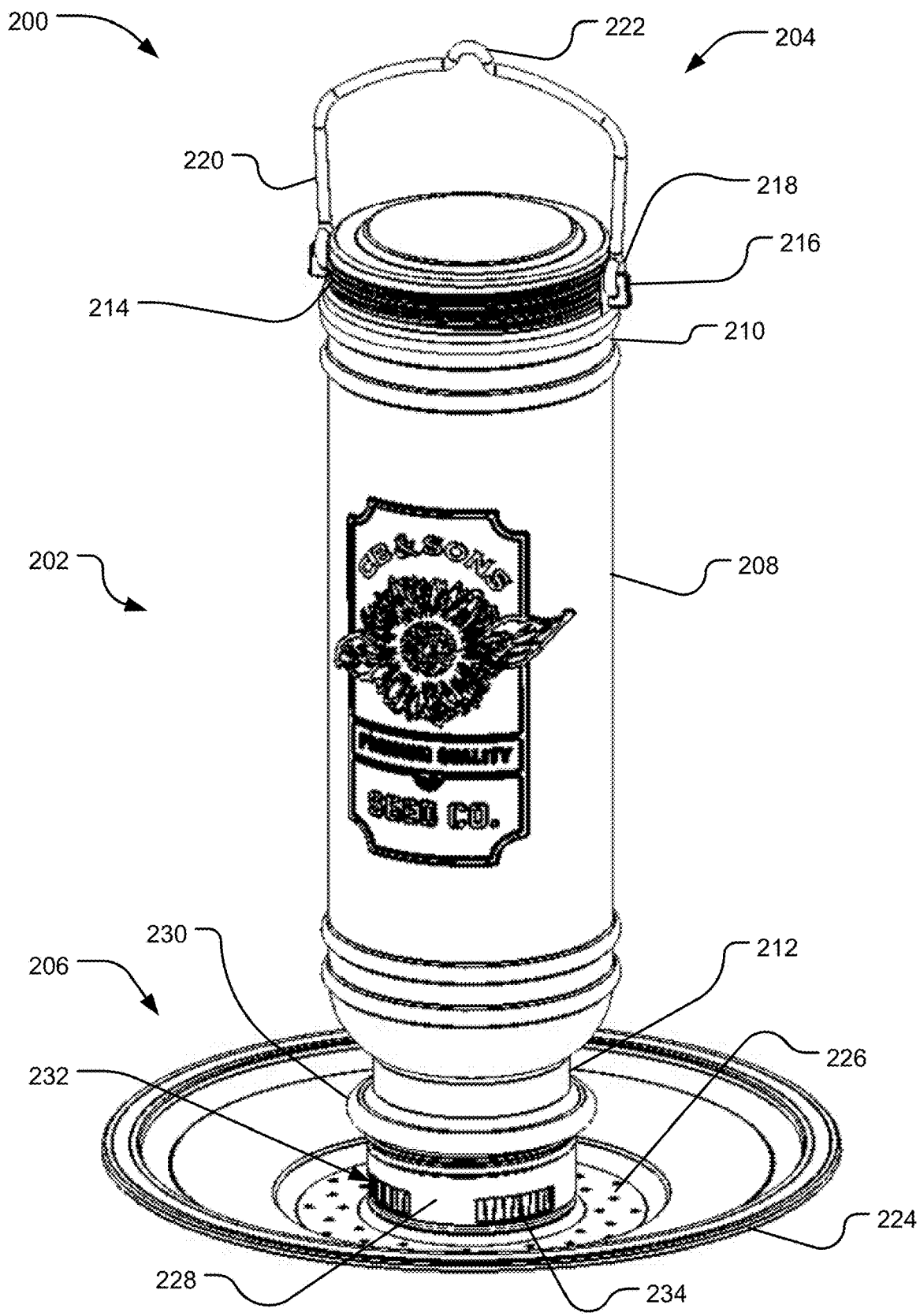
FIG. 1 shows a perspective view of an example bird feeder that facilitates filling and reduces spillage of seed.

Aspects of the present disclosure involve apparatuses and methods for facilitating filling and cleaning of bird feeders that are aesthetically pleasing and adaptable for attracting different types of birds. In one aspect, a bird feeder adapted to hold and dispense seed is provided. The seed bird feeder includes a bottle, a hanger assembly, and a basin assembly. To facilitate filling and cleaning, the bottle includes a wide mouth opening at a first end of the bottle and an opening at the opposing end of the bottle through which to dispense the seed into the basin assembly for access by one or more birds. The hanger assembly includes a removable cap that engages the wide mouth opening of the bottle. The cap may be removed to access an interior of the bottle for cleaning or filling. The basin assembly includes a small seed converter that may be optionally used to dispense small seeds, such that the user may choose which birds to attract.

In some aspects, the bird feeders have a decorative, antique appearance with a glass bottle and metal accent finishing to provide an attractive, upscale appearance that is appealing to users. The bottles may be a variety of colors with different engravings or other decorative features. For example, the bird feeders may have features similar to those shown in U.S. Design Patent Application 29/438,289, entitled "Bottle for a Wild Bird Feeder" and filed on Nov. 28, 2012, which is incorporated herein in their entirety. Furthermore, the bird feeders may include other decorative features such as a cage and/or roof assembly or have a decorative, lantern-like appearance.

For a detailed description of an example seed bird feeder 200, reference is made to FIGS. 1-6. As can be understood from FIG. 1, which shows a perspective view of the seed bird feeder 200, a reservoir 202 is configured to hold bird food, which may various types and sizes of seeds. The seed bird feeder 200 further includes a hanger assembly 204 and a basin assembly 206. The seed bird feeder 200 facilitates disassembly to allow for quick cleaning.

The reservoir 202 is a bottle that may be made from a variety of materials, including but not limited to glass, metal, ceramics, plastics, or the like, and include one or more decorative features. To increase aesthetic appeal, the reservoir 202 may be made from glass that includes different decorative features, such as color, engraving, or other designs.

In one implementation, the reservoir 202 includes an elongated portion 208, a cap engaging portion 210, and a mouth 212 that may be tapered to dispense seed into the basin assembly 206. The reservoir 202 may be a variety of shapes and sizes. For example, the reservoir 202 may be an elongated tube with a generally cylindrical shape. However, other shapes are contemplated, including, without limitation, generally cylindrical, conical, cubical, contoured, angular, or the like. Further, the reservoir 202 may be adapted to hold various capacities of seed. For example, the reservoir 202 may be adapted to hold approximately 1.5 pounds of seed. However, other sizes are contemplated that maximize the capacity of seed without sacrificing the ability to hang the seed bird feeder 200 in various locations.

As can be understood from FIG. 1, in one implementation, the hanger assembly 204 includes a cap 214 and a hanger 220. The hanger assembly 204 may be made from a variety of materials, including but not limited to metal, glass, ceramics, plastics, or the like, and include one or more decorative features. To increase aesthetic appeal, the hanger assembly 204 may be made from a metal having decorative features, such as color (e.g., pewter), engravings, designs, or the like.

The cap 214 may be sized and shaped to mirror the size and shape of the cap engaging portion 210 of the reservoir 202, and the hanger 220 may be sized and shaped to adequately hold the seed bird feeder 200 when suspended. In one implementation, the cap 214 includes an engaging member 216 adapted to receive an engaging member 218 of the hanger 220. In one implementation, the hanger 220 includes a hanging portion 222 that permits the hanger 220 to securely attach and suspend the seed feeder 200 from an item, such as a tree limb, hook, or the like.

The basin assembly 206 is adapted to permit one or more birds to access the seed. The basin assembly 206 may be made from a variety of materials, including but not limited to metal, glass, ceramics, plastics, or the like, and include one or more decorative features. To increase aesthetic appeal, the basin assembly 206 may be made from a metal having decorative features, such as color (e.g., pewter), engravings, designs, or the like.

Figure 2:
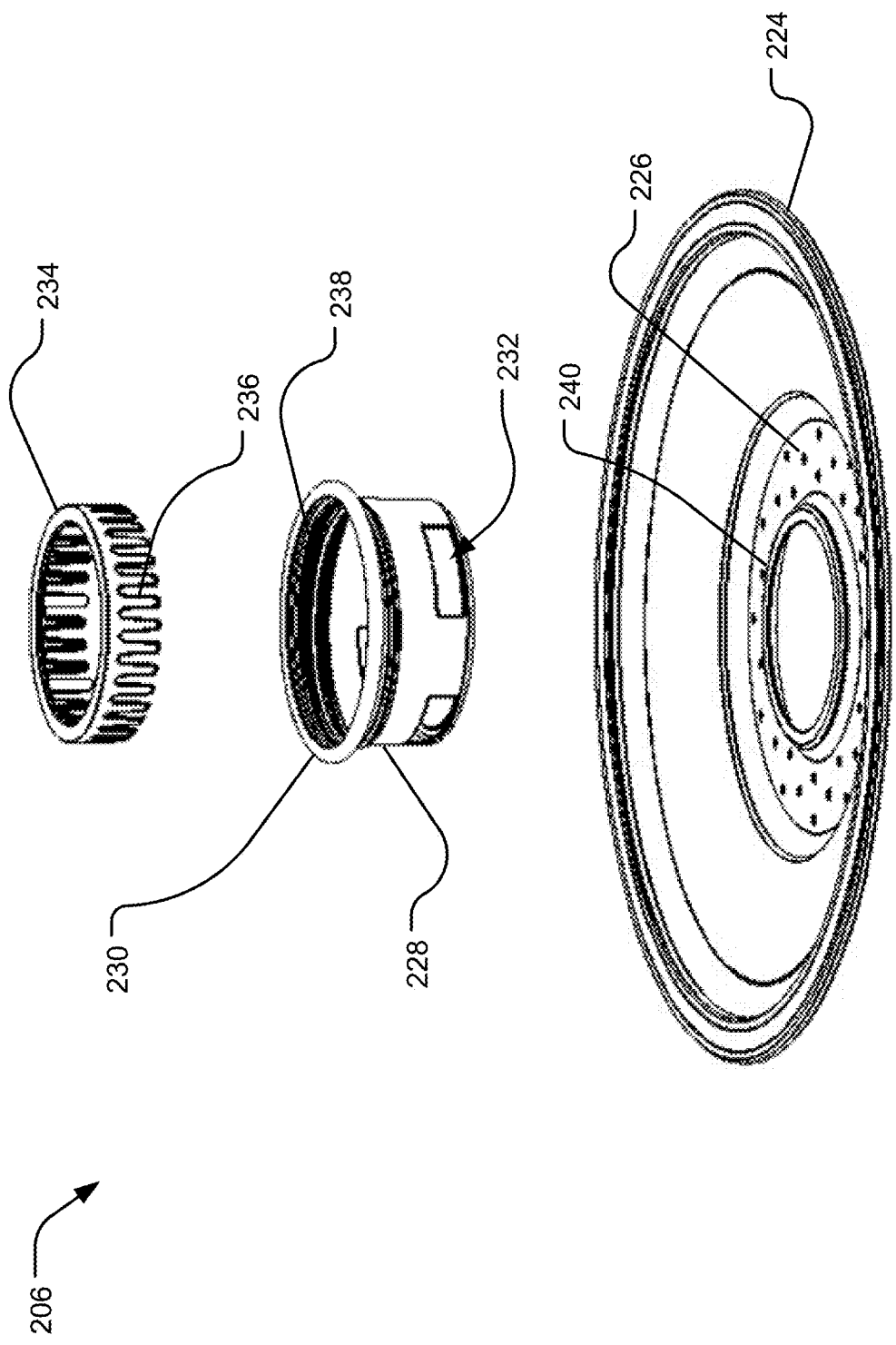
FIG. 2 illustrates an exploded view of an example basin assembly having a small seed converter for the bird feeder of FIG. 1.
Figure 3:
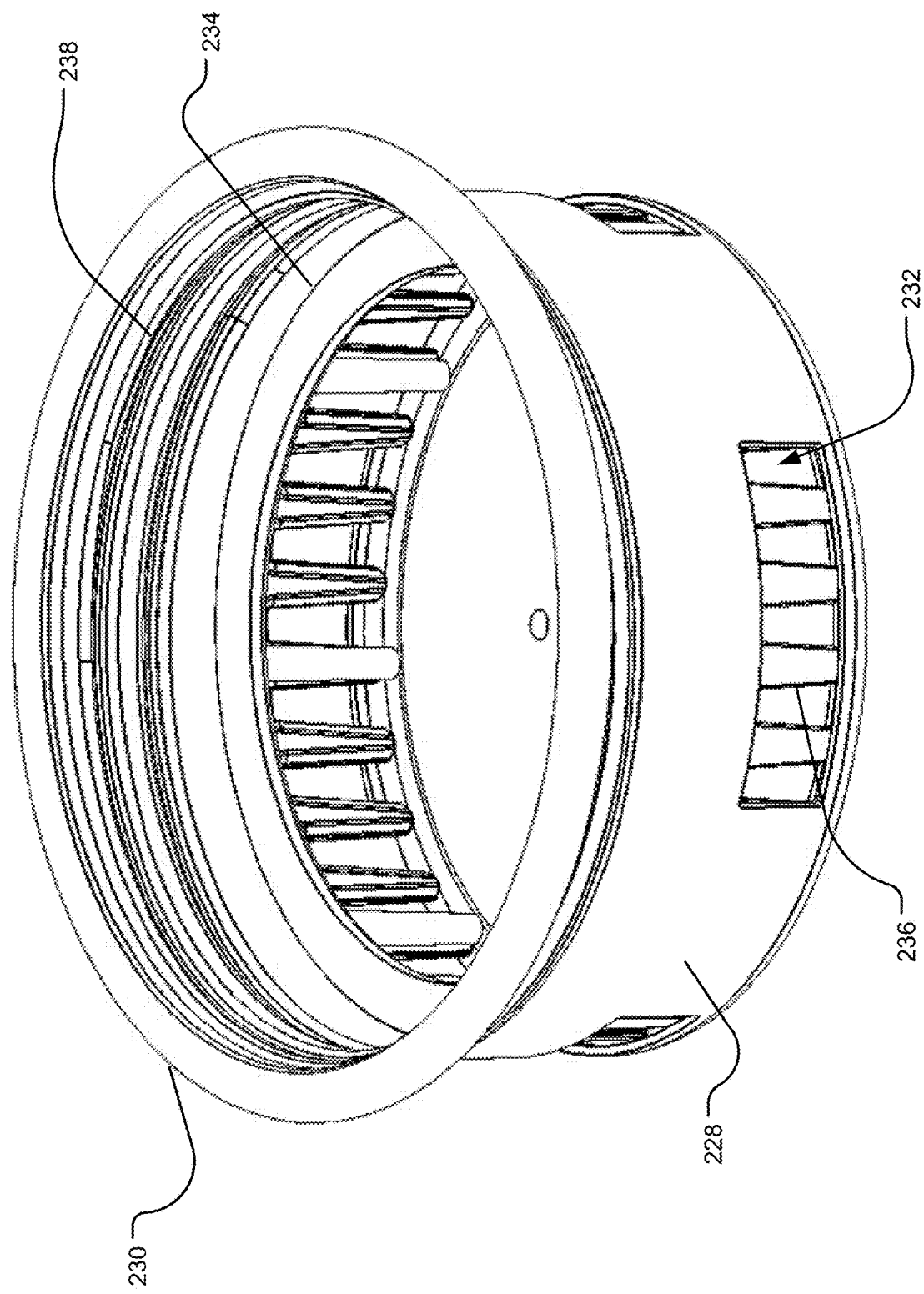
FIG. 3 displays a detailed assembled view of the small seed converter and feeding port of the basin assembly of FIG. 2.

As can be understood from FIGS. 1-3, in one implementation, the basin assembly 206 includes a perch 224 from which one or more birds may be positioned to access seed dispensed from the reservoir 202 into a basin 226 through one or more openings 232 in a port 228. In one implementation, the port 228 is engaged to the basin 226 using a receiver 240 extending from the basin 226. The size and shape of the port 228 may mirror the size and shape of the mouth 212 of the reservoir 202. Further, the port 228 may include a lip 230 having a connecting portion 238, for example, having helical threads, to engage the mouth 212 to close or occlude the reservoir 202. The one or more openings 232 may be sized to dispense large seeds, and if the user desires to attract birds that eat small seeds (e.g., thistle seeds), a small seed converter 234 having a plurality of teeth 236 may be inserted into the port 228 to narrow the openings 232 to dispense the small seeds.

Figure 4:
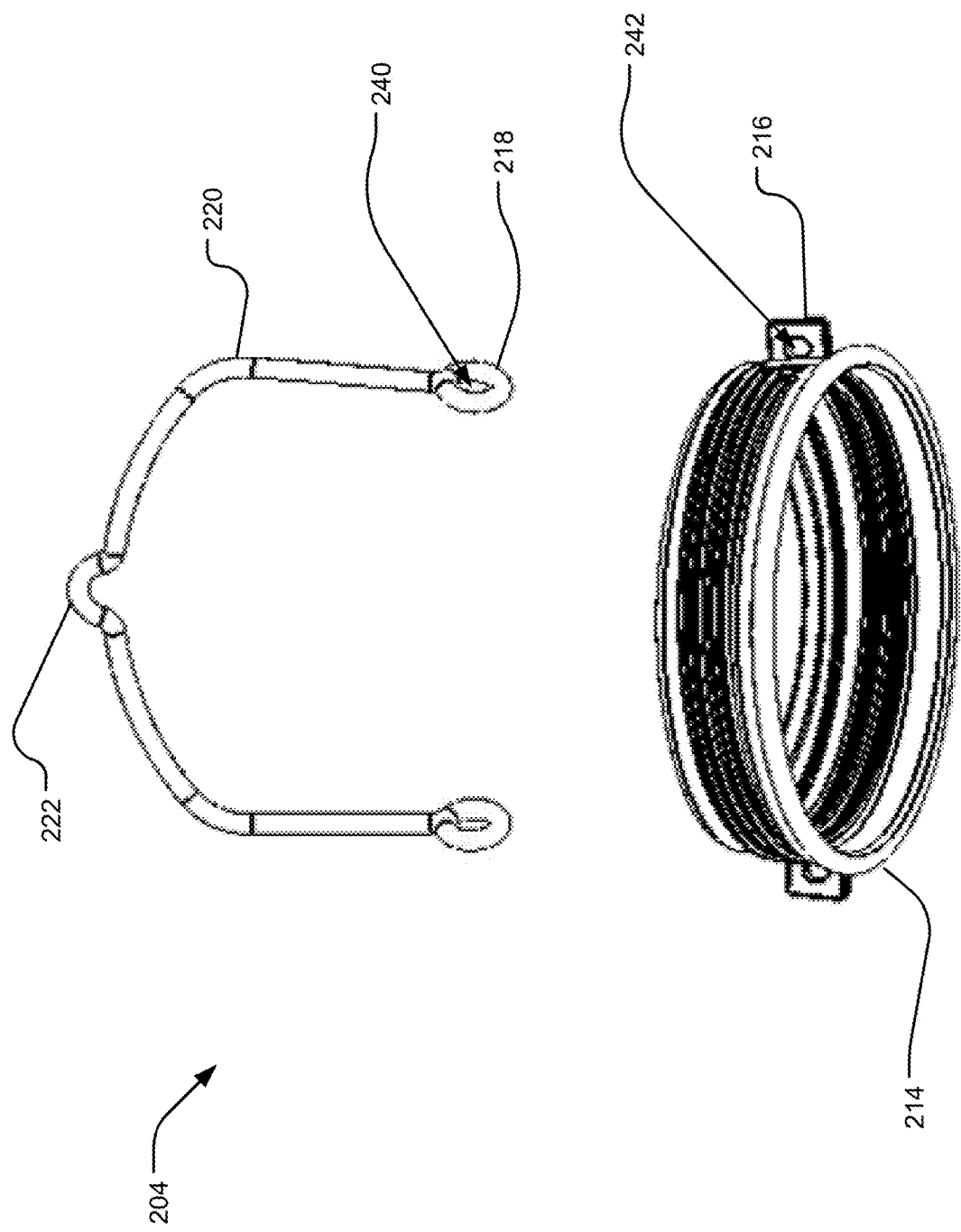
FIG. 4 shows an exploded view of an example hanger assembly for the bird feeder of FIG. 1.

As can be understood from FIG. 4, which shows an exploded view of the hanger assembly 204, the engaging members 216 and 218 may be any engaging feature that permits the cap 214 to attach to the hanger 220 in a manner that allows the hanger 220 to move. For example, the engaging members 216 and 218 may each be hooks having openings 242 and 240, respectively, to engage one another in a manner that permits movement of the hanger 220.

Figure 5:
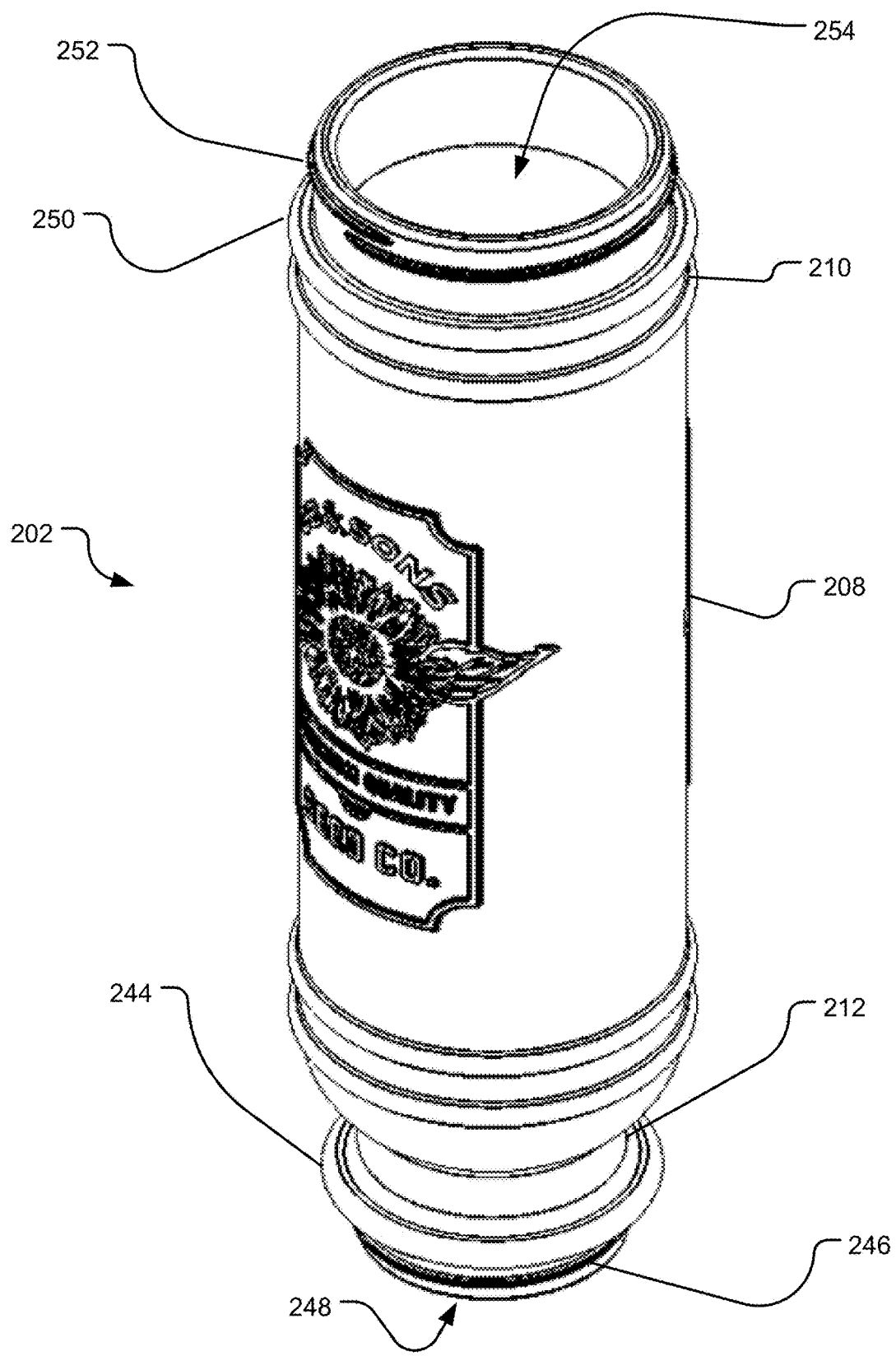
FIGS. 5 and 6 illustrate a top perspective view and a bottom perspective view, respectively, of an example bottle for the bird feeder of FIG. 1.
Figure 6:
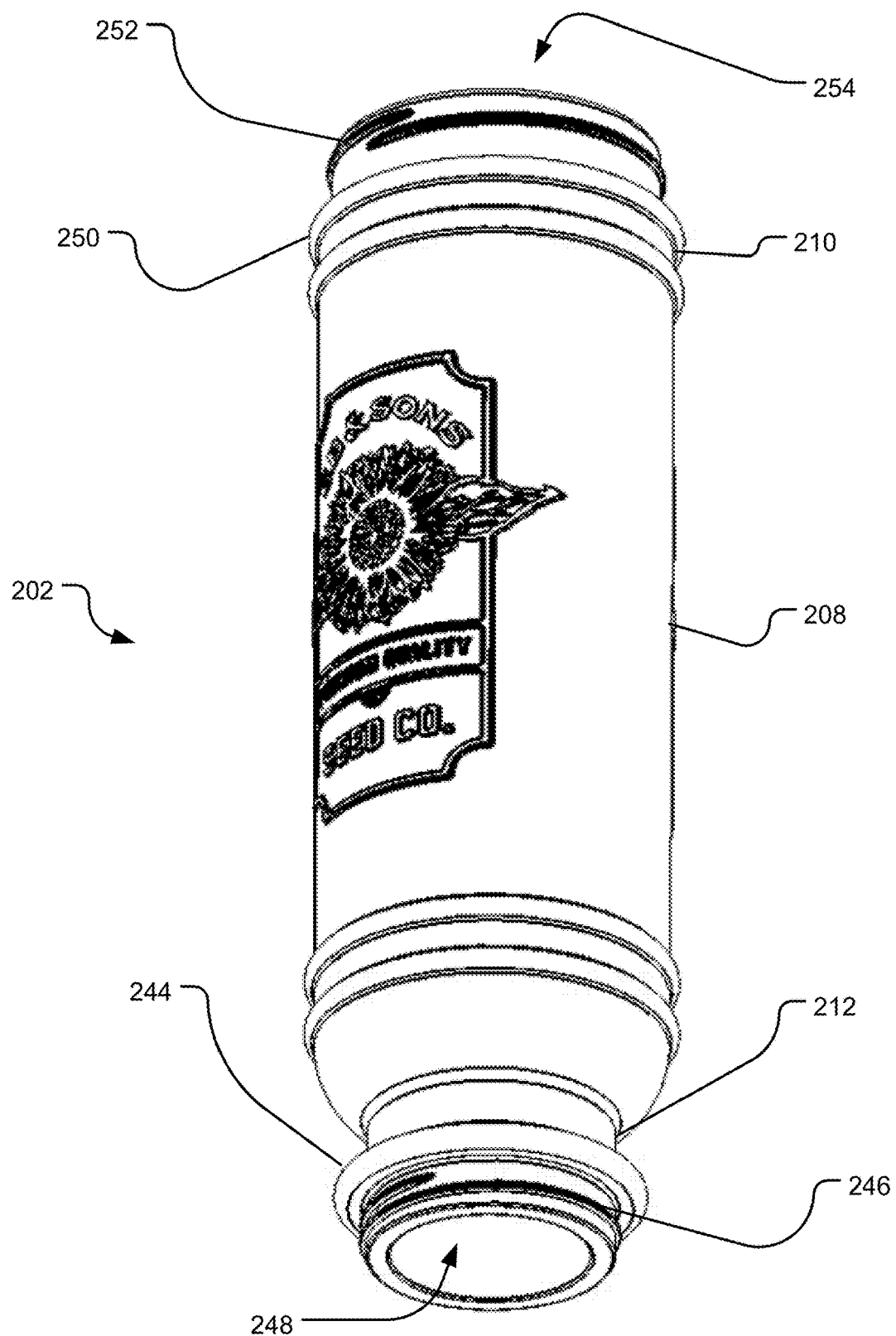
Figure 7A:
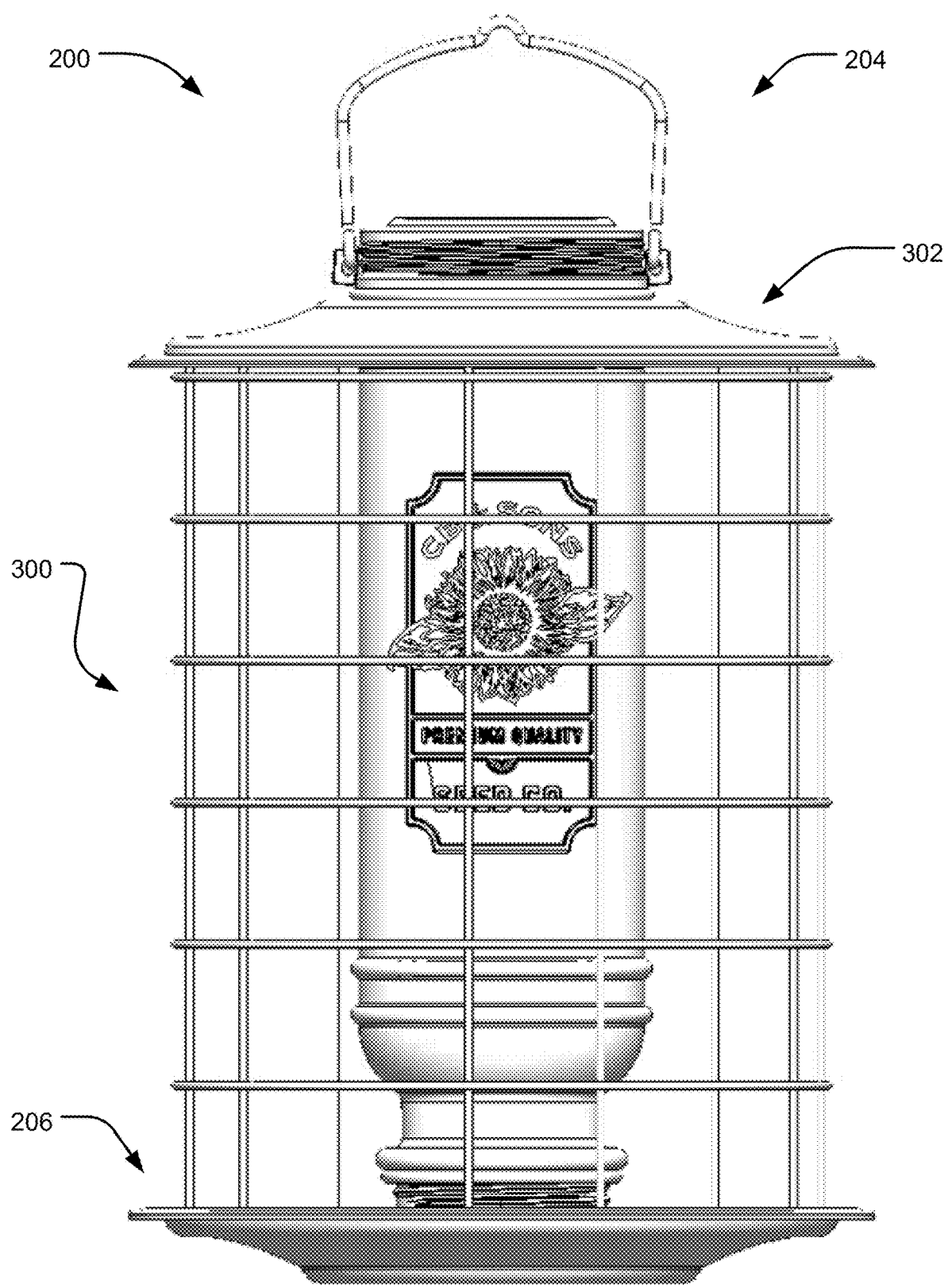
FIG. 7A is a front view of the bird feeder of FIG. 1 with a decorative cage and roof assembly.
Figure 7C:
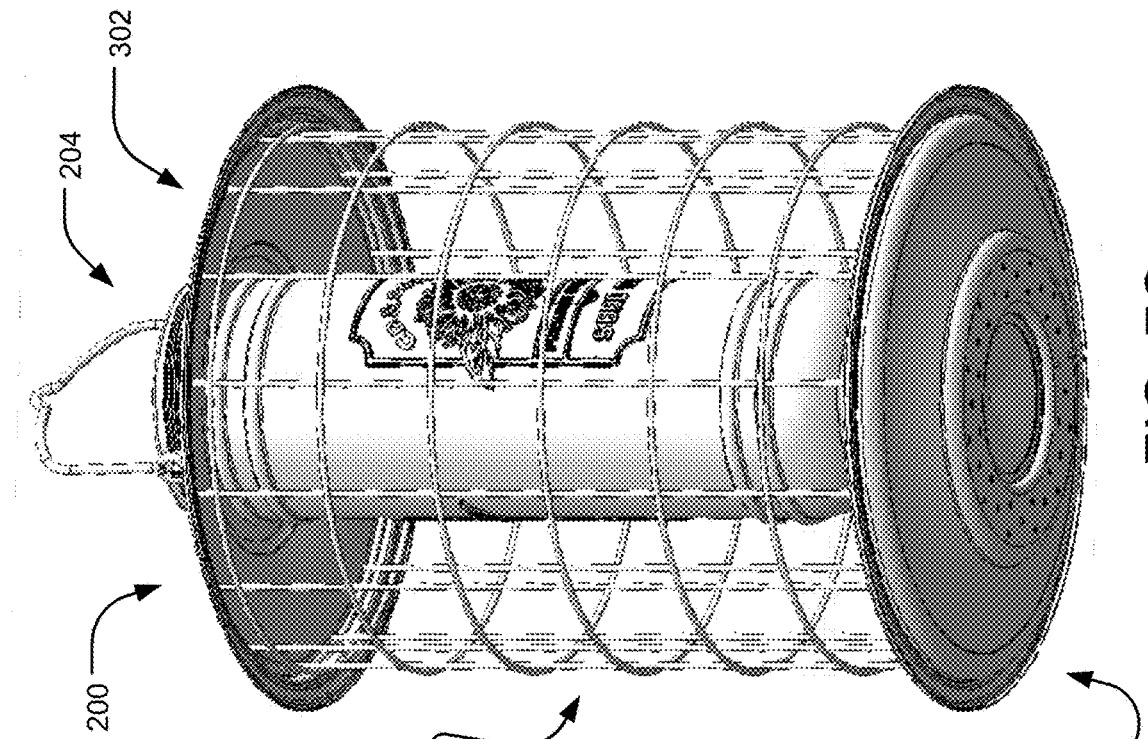
FIGS. 7B and 7C are top perspective and bottom perspective views, respectively, of the bird feeder of FIG. 7A.
Figure 7B:
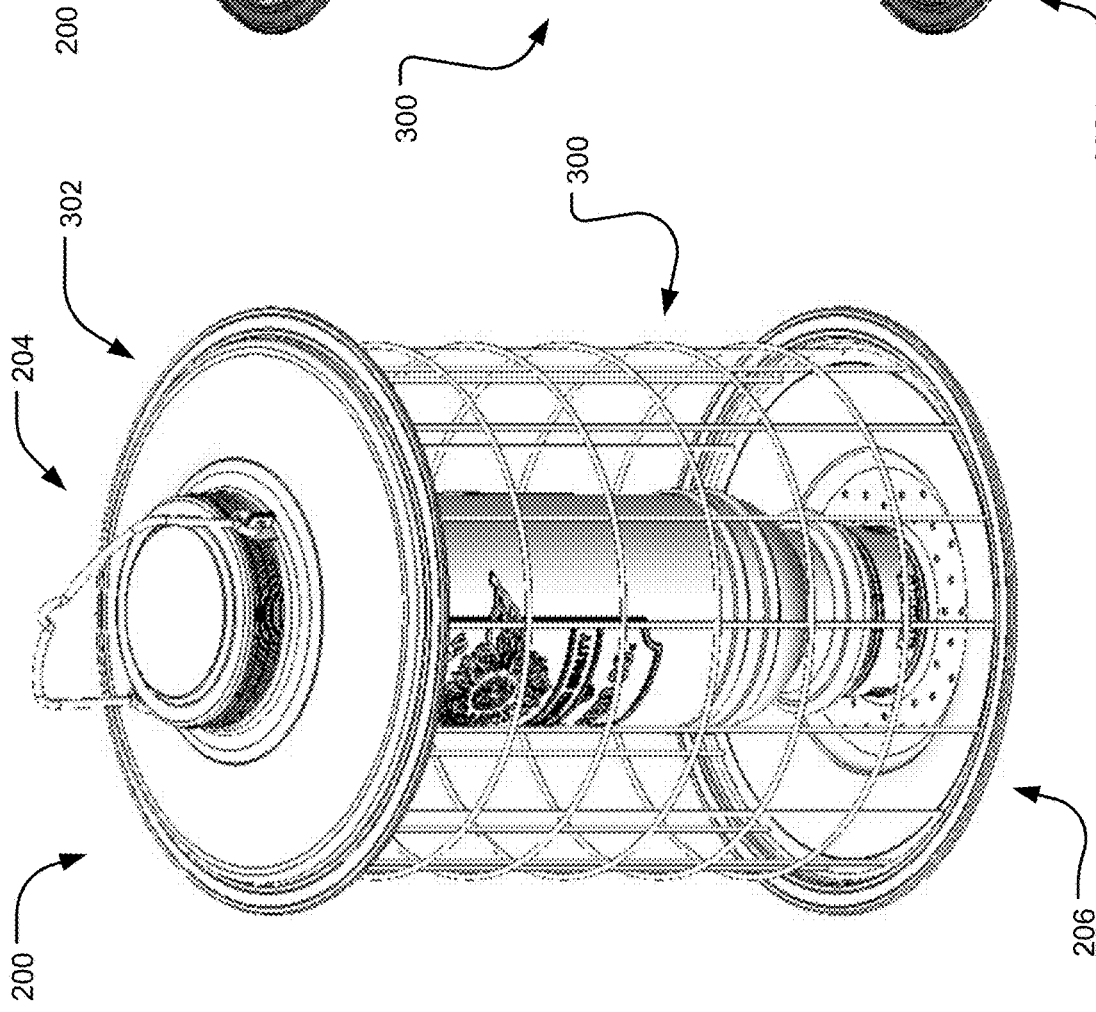
Figure 7E:
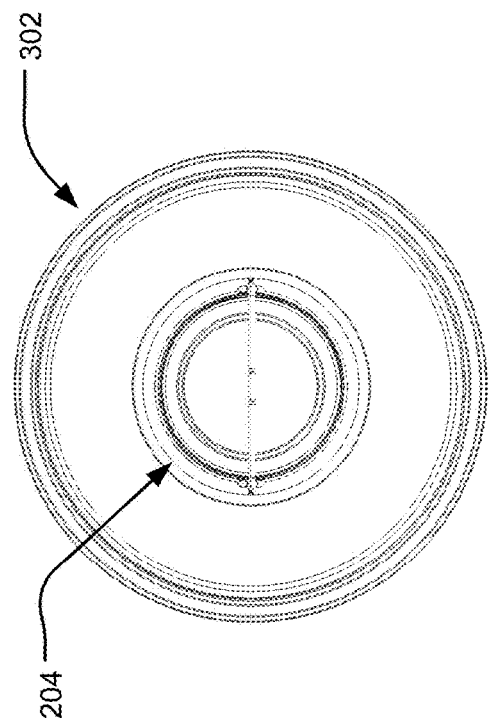
FIGS. 7E and 7F show top and bottom views, respectively, of the bird feeder of FIG. 7A.
Figure 7F:
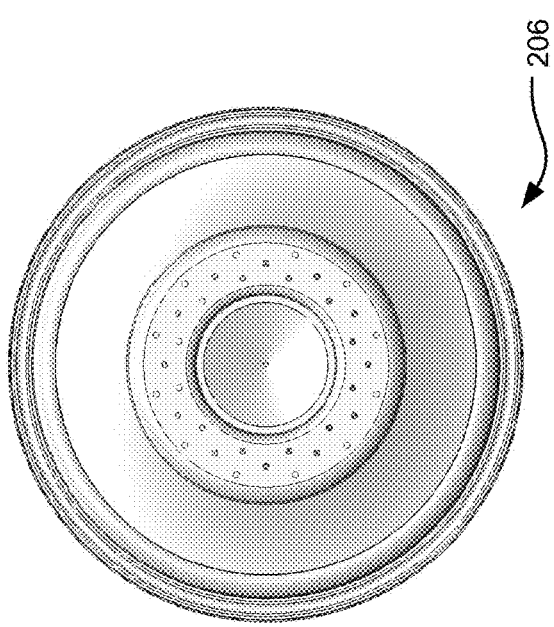
Figure 7D:
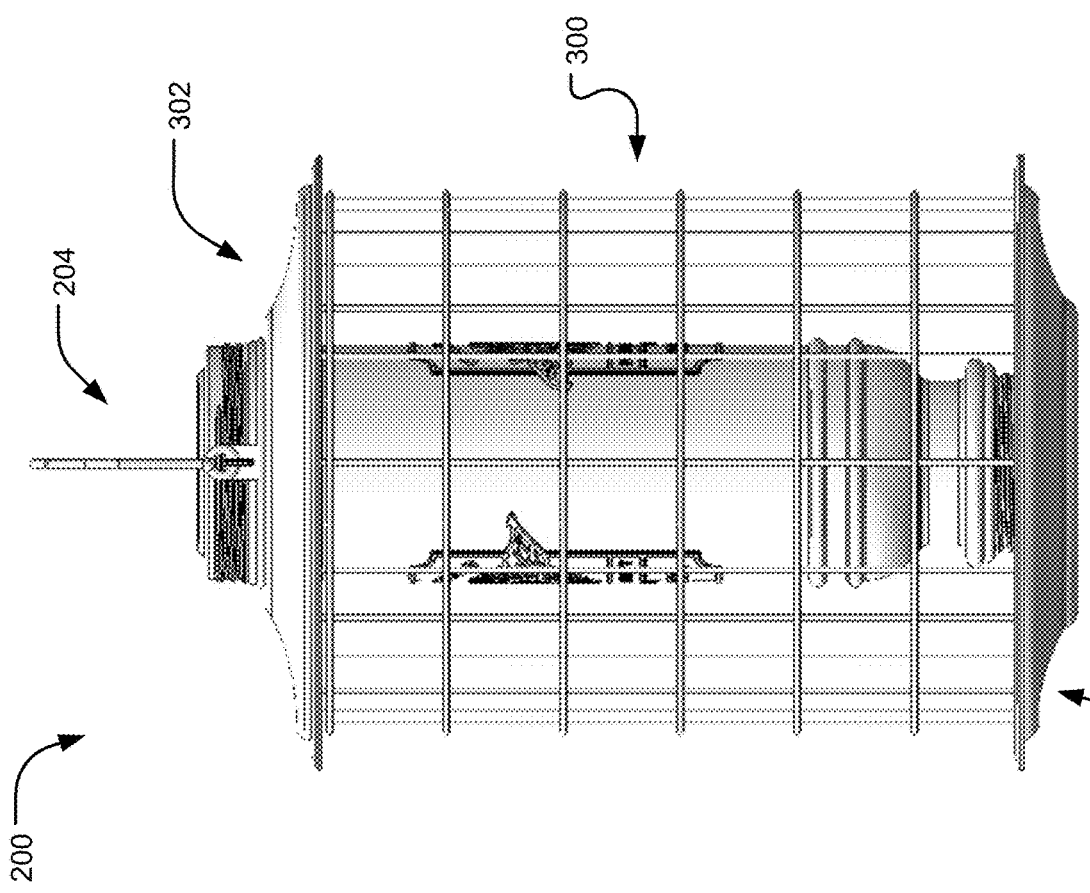
FIG. 7D shows a side view of the bird feeder of FIG. 7A.
Figure 8A:
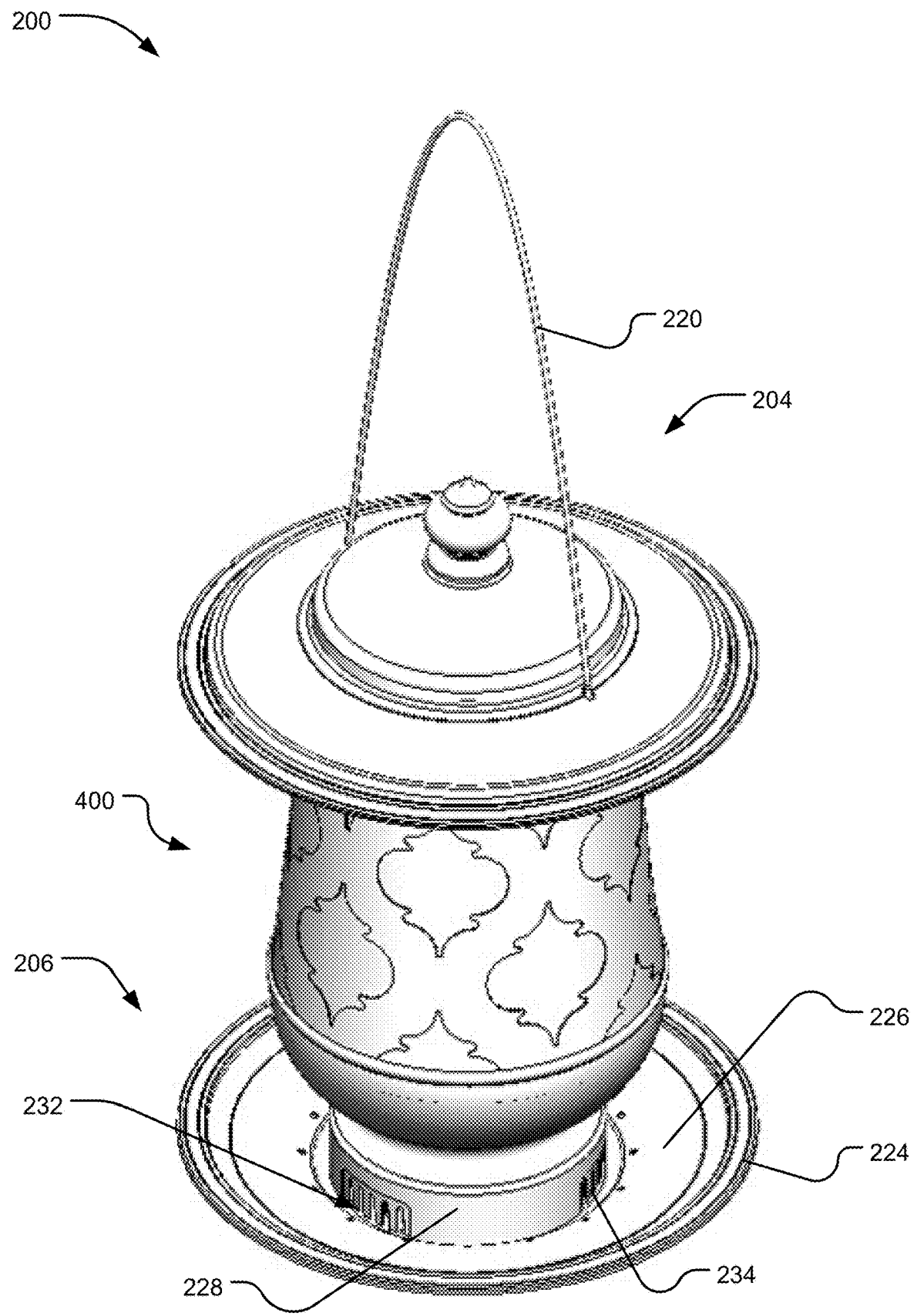
FIG. 8A is an isometric view of another example bird feeder that facilitates filling and reduces spillage of seed.
Figure 8C:
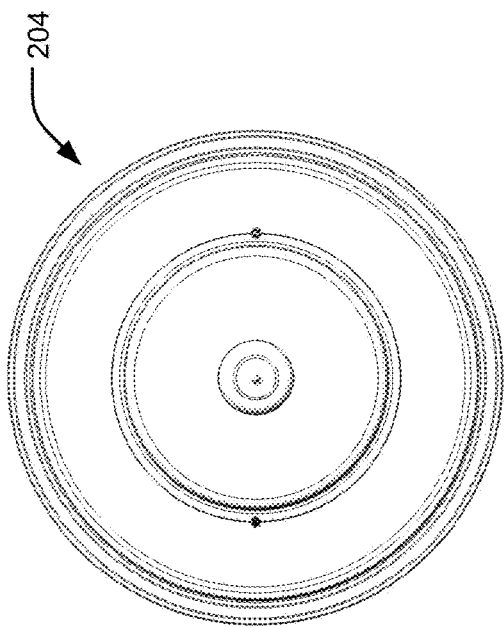
FIGS. 8C and 8D are top and bottom views, respectively, of the bird feeder of FIG. 8A.
Figure 8D:
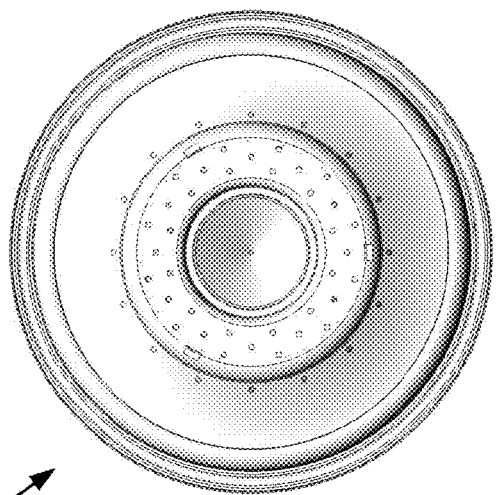
Figure 8B:
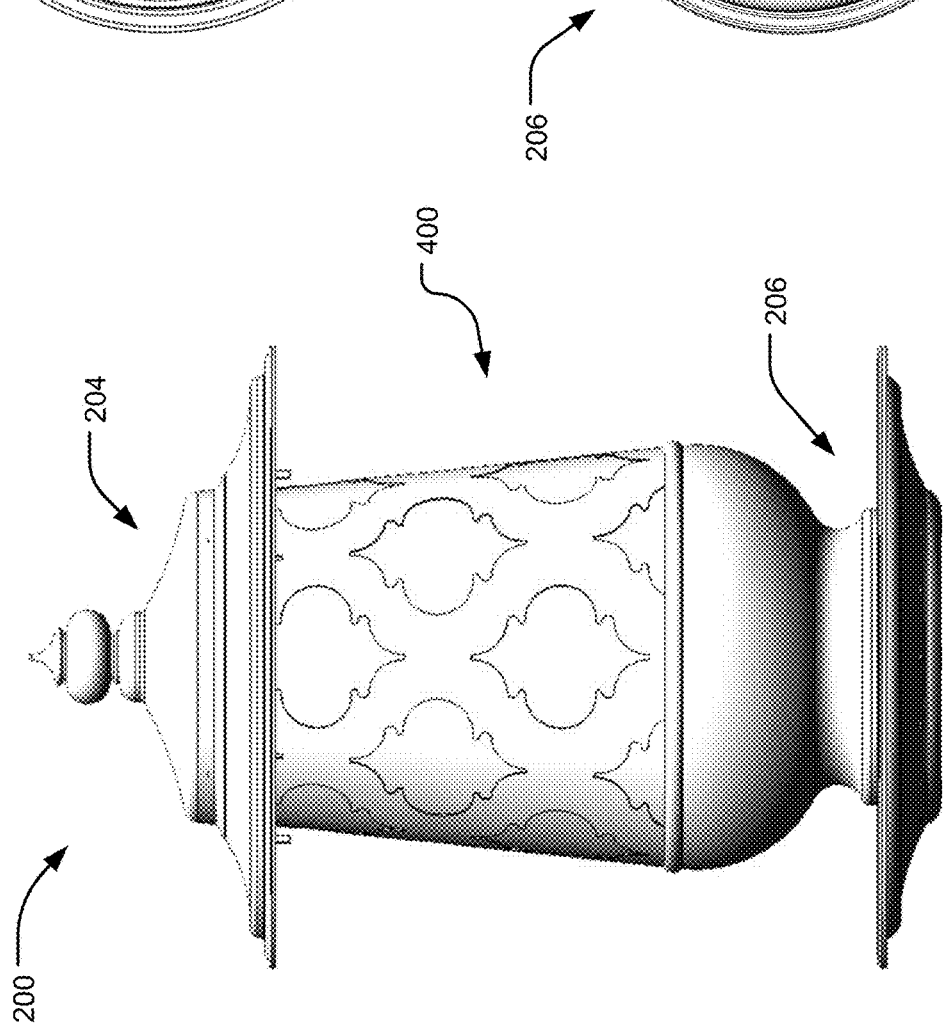
FIG. 8B is a side view of the bird feeder of FIG. 8A.
Figure 10:
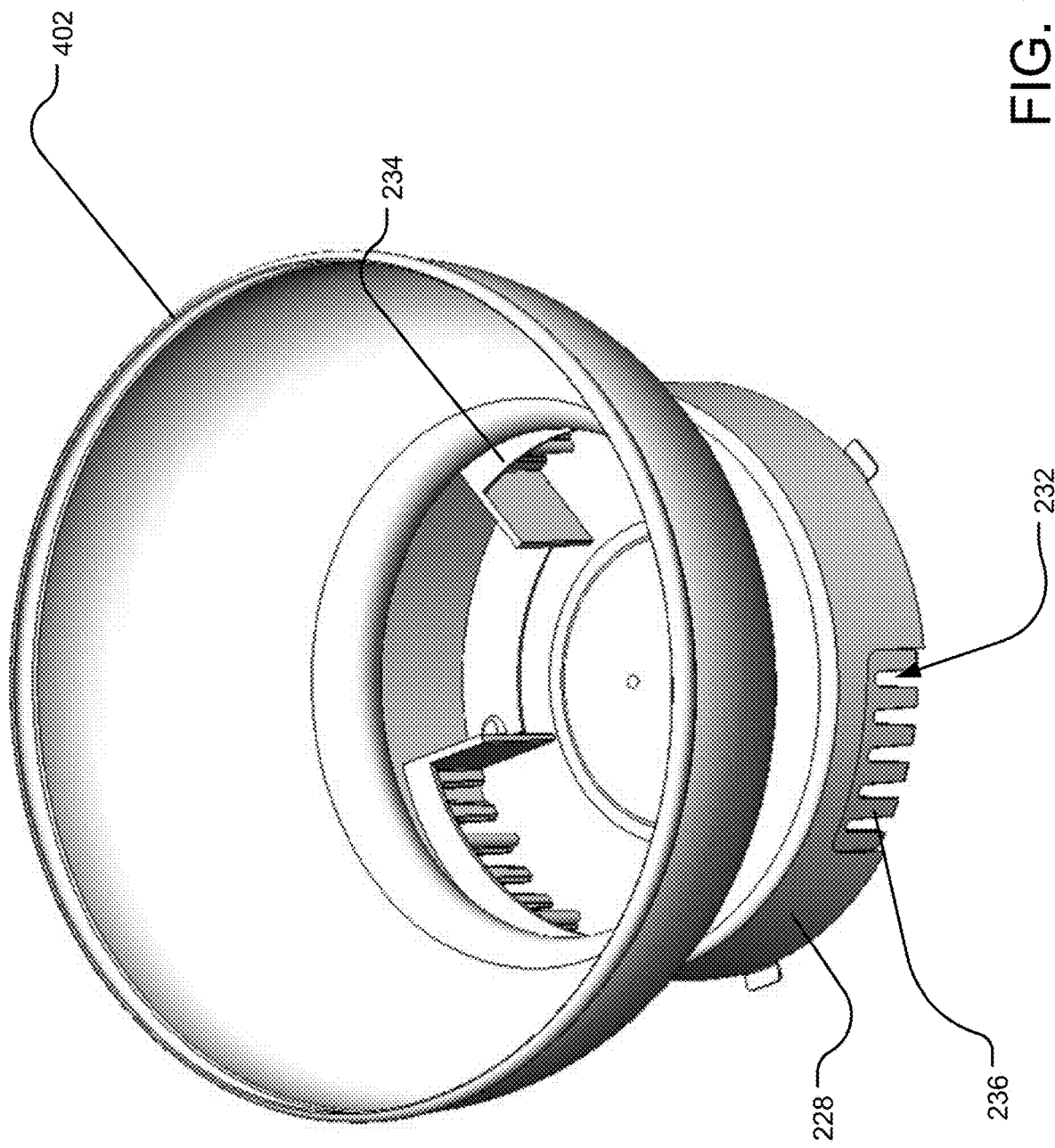
FIG. 10 shows a base of the bird feeder of FIG. 8A with the small seed converter inserted.
Figure 11:
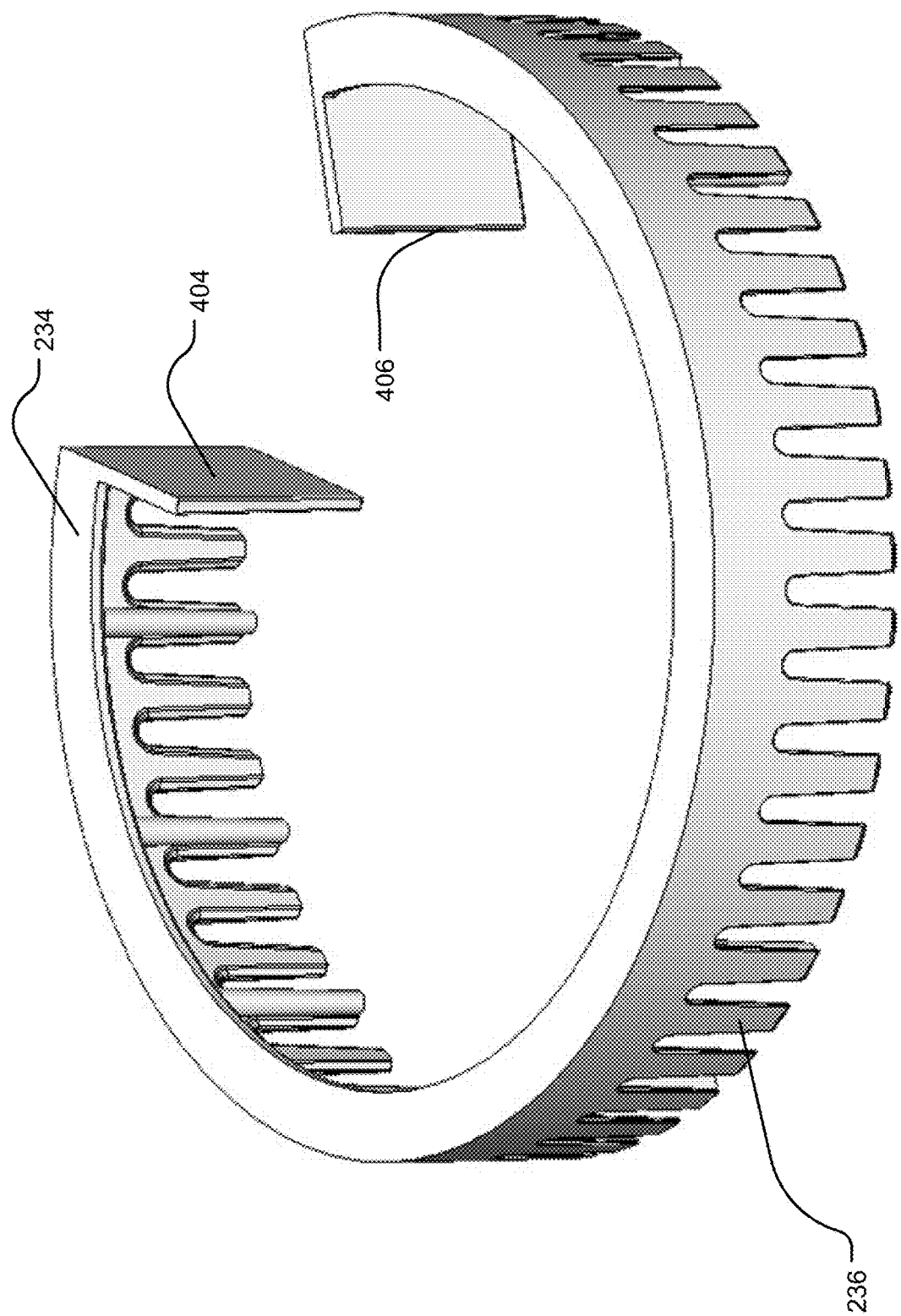
FIG. 11 shows the small seed converter of FIG. 10.

Turning to FIGS. 5 and 6, the reservoir 202 includes the elongated portion 208 extending between a first end and a second end. In one implementation, the reservoir 202 includes one or more decorative lips 250, for example, near the cap engaging portion 210, near the mouth 214, and/or along the elongated portion 208. The cap engaging portion 210 may further include one or more engagers 252, such as helical threads, disposed on a surface extending from a proximal edge defining an opening 254. The engagers 252 are configured to engage the hanger assembly 204. Similarly, the mouth 212 may further include one or more engagers 246, such as helical threads, to engage the port 228 of the basin assembly 206.

To facilitate cleaning and filling of the seed bird feeder 200, in one implementation, the reservoir 202 includes an opening at each end of the elongated portion 208. Stated differently, the cap engaging portion 210 includes the opening 254 and the mouth 212 includes an opening 248. As such, the reservoir 202 may be cleaned by running water from a hose or facet through one of the openings 254 and 248 into the reservoir 202 and out the other opening 254 and 248. Alternatively or additionally, the reservoir 202 may be cleaned using a dishwasher.

To fill the seed bird feeder 200, the cap 214 may be removed from the cap engaging portion 210 of the reservoir 202. The selected seed is then poured into the reservoir 202 through the opening 254, which may be relatively wide to prevent spillage. The cap 214 is then secured to the cap engaging portion 210 of the reservoir 202, and the seed bird feeder 200 is suspended using the hanger 220. Gravity forces the seed through the opening 246 of the mouth 212 to dispense seed into the basin assembly 206.

As shown in FIGS. 7A to 7F, the seed bird feeder 200 may be positioned within a decorative cage 300 for aesthetic appeal. In one implementation, the cage 300 is formed by a plurality of elongated rods extending vertically from the basin assembly 205 to a roof assembly 302 and a plurality of looped rods extending around the reservoir 202. There may be any number of the elongated rods and/or the looped rods of any shape or size according to design preferences. The roof assembly 302 may be disposed near the hanger assembly 204. In one implementation, the roof assembly slopes from the hanger assembly 204 to mirror the shape of the basin assembly 206. In some implementations, the cage 300 may discourage or prevent other animals or larger birds from reaching the dispensed seed.

As can be understood from FIGS. 8A to 11, the small seed converter 234 may be used with various bird feeders having different aesthetic features. For example, the seed bird feeder 200 may include a reservoir 400 sized and shaped to resemble a lantern. The reservoir 400 may have a variety of patterns, designs, colors, or other decorative features.

In one implementation, the reservoir 400 is configured to receive, hold, and dispense different sizes and types of bird seed depending on the preferences of the user. As can be understood from FIGS. 9A to 11, the seed is dispensed from the reservoir 400 into the basin assembly 206 through the one or more openings 232 in the port 228. In one implementation, the port 228 connects to or otherwise extends from a base 402 of the reservoir 400. The one or more openings 232 may be sized to dispense large seeds, and if the user desires to attract birds that eat small seeds (e.g., thistle seeds), the small seed converter 234 having a plurality of teeth 236 may be inserted into the port 228 to narrow the openings 232 to dispense the small seeds. In one implementation, the small seed converter 234 extends from a first end 404 to a second end 406. In another implementation, the small seed converter 234 includes a top edge that is substantially continuous, defining a circular, elliptical, rectangular, triangular, contoured, angled, and/or other shape.

Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A bird feeder comprising:
    a port having a surface extending from a proximal end to a distal end, the proximal end having a connecting portion configured to connect to a reservoir, the surface having one or more openings defined therein and forming a port internal volume, the reservoir having at least one wall forming a reservoir internal volume, such that when the reservoir is connected to the connection portion of the port, the port internal volume and the reservoir internal volume are in direct communication with each other to form a contiguous volume; and
    a small seed converter insertable into the port internal volume, the small seed converter including a plurality of teeth extending from an edge, the plurality of teeth configured to narrow the one or more openings for dispensing small sized seed.

2. The bird feeder of claim 1, wherein the small seed converter is circular in shape.

3. The bird feeder of claim 1, wherein the small seed converter extends from a first end to a second end.

4. The bird feeder of claim 1, wherein the connecting portion of the proximal end is connected to a base of the reservoir.

5. The bird feeder of claim 4, wherein the base of the reservoir is connected to the connecting portion to form a continuous piece.

6. The bird feeder of claim 1, wherein the connecting portion of the proximal end is connected to a mouth of the reservoir.

7. The bird feeder of claim 1, wherein the small sized seed is thistle seed.

8. A bird feeder comprising:
    a cap engaging portion having a proximal opening defined by a proximal edge, the cap engaging portion having a proximal surface extending distally from the proximal edge with one or more proximal engagers disposed on the proximal surface, the one or more proximal engagers configured to engage a hanger assembly;
    a mouth having a distal opening defined by a distal edge, the mouth having a distal surface extending proximally from the distal edge with one or more distal engagers disposed on the distal surface, the one or more distal engagers configured to engage a basin assembly; and
    an elongated body extending between the cap engaging portion and the mouth.

9. The bird feeder of claim 8, wherein the cap engaging portion, the mouth, and the elongated body form a glass bottle reservoir.

10. The bird feeder of claim 8, wherein the proximal engagers and the distal engagers are helical threads.

11. The bird feeder of claim 1, wherein the proximal end includes a lip and the connecting portion includes helical threads.

12. The bird feeder of claim 8, further comprising:
    a port having a surface extending from a proximal end to a distal end, the proximal end having a connecting portion configured to connect to the distal engagers, the surface having one or more openings defined therein.

13. The bird feeder of claim 12, wherein the distal end of the port is engaged to a basin.

14. The bird feeder of claim 12, wherein one or more perches are disposed relative to the one or more openings.

15. The bird feeder of claim 12, wherein a small seed converter is insertable into the port to narrow the one or more openings for dispensing small sized seed.

16. A bird feeder comprising:
    a cap engaging portion of a reservoir having a proximal opening defined by a proximal edge, the cap engaging portion having a proximal surface extending distally from the proximal edge with one or more proximal engagers disposed on the proximal surface;
    a cap releasably engageable to the proximal engagers to occlude the proximal opening;
    a mouth of the reservoir having a distal opening defined by a distal edge, the mouth having a distal surface extending proximally from the distal edge with one or more distal engagers disposed on the distal surface;
    an elongated body of the reservoir extending between the cap engaging portion and the mouth; and a basin assembly releasably engageable to the one or more distal engagers disposed on the distal surface, the basin assembly configured to receive bird food dispensed through the mouth from an interior of the reservoir.

17. The bird feeder of claim 16, wherein the basin assembly includes a port having a surface extending from a proximal end to a distal end, the proximal end having a connecting portion configured to connect to the distal engagers, the surface having one or more openings defined therein.

18. The bird feeder of claim 17, wherein a small seed converter is insertable into the port to narrow the one or more openings for dispensing small sized seed.

19. The bird feeder of claim 16, wherein the reservoir is positioned within a cage.

20. The bird feeder of claim 16, wherein the proximal engagers and the distal engagers are helical threads.

* * * * *